United States Patent
Nair et al.

(10) Patent No.: US 9,940,757 B2
(45) Date of Patent: Apr. 10, 2018

(54) MODIFYING A SIMULATED CHARACTER BY DIRECT MANIPULATION

(71) Applicant: Electronic Arts Inc., Redwood City, CA (US)

(72) Inventors: Srikumar M. B. Nair, Palo Alto, CA (US); Steven Ray Rheinfrank, Daly City, CA (US); Glenn Shayn Song, Redwood City, CA (US); Pawel Piotr Wrotek, San Mateo, CA (US)

(73) Assignee: ELECTRONIC ARTS INC., Redwood City, CA (US)

( * ) Notice: Subject to any disclaimer, the term of this patent is extended or adjusted under 35 U.S.C. 154(b) by 352 days.

(21) Appl. No.: 14/674,511

(22) Filed: Mar. 31, 2015

(65) Prior Publication Data
US 2016/0030839 A1 Feb. 4, 2016

Related U.S. Application Data

(60) Provisional application No. 62/032,220, filed on Aug. 1, 2014.

(51) Int. Cl.
| | |
|---|---|
| *G06T 19/20* | (2011.01) |
| *G06T 17/10* | (2006.01) |
| *A63F 13/63* | (2014.01) |
| *A63F 13/825* | (2014.01) |
| *A63F 13/25* | (2014.01) |

(52) U.S. Cl.
CPC .............. *G06T 19/20* (2013.01); *A63F 13/63* (2014.09); *A63F 13/825* (2014.09); *A63F 13/25* (2014.09); *A63F 2300/5553* (2013.01); *G06T 17/10* (2013.01); *G06T 2219/2012* (2013.01); *G06T 2219/2021* (2013.01)

(58) Field of Classification Search
None
See application file for complete search history.

(56) References Cited

U.S. PATENT DOCUMENTS

| | | | |
|---|---|---|---|
| 8,793,620 B2* | 7/2014 | Stafford | G06F 3/012 345/159 |
| 2011/0248992 A1* | 10/2011 | van Os | G06T 11/60 345/419 |
| 2013/0002600 A1* | 1/2013 | McCracken | G06F 3/0416 345/174 |

OTHER PUBLICATIONS

Kaeria Eurl, "iPhone, iPad, iPod, iOS _ Plastic Surgery Simulator", Aug. 7, 2013, Kaeria Eurl.*
Chen, "QuickTime® VR—An Image-Based Approach to Virtual Environment Navigation", 1995.*

* cited by examiner

*Primary Examiner* — Mark Zimmerman
*Assistant Examiner* — Yu-Jang Tswei
(74) *Attorney, Agent, or Firm* — Lowenstein Sandler LLP

(57) ABSTRACT

A portion of a simulated element of a graphical simulation available for modification is identified in view of a cursor location associated with a user input device. The identified portion of the simulated element is selected for modification. The selected portion of the simulated element is then modified according to a direct manipulation of a display of the selected portion of the simulated element by a user using the user input device.

20 Claims, 17 Drawing Sheets

MODIFYING A SIMULATED CHARACTER BY DIRECT MANIPULATION

RELATED APPLICATIONS

This application is related to and claims the benefit of U.S. Provisional Patent application Ser. No. 62/032,220, filed Aug. 1, 2014, which is hereby incorporated by reference.

TECHNICAL FIELD

The present disclosure is generally related to graphical simulations, and more particularly, to modification of simulated characters in graphical simulations.

BACKGROUND

Simulation video games are a category of video games generally designed to simulate aspects of a real or fictional reality as closely as possible. A "life simulation" is a sub category of simulation video games in which a player can control one or more virtual life forms (e.g., a simulated human character, an animal, etc.). The SIMS 3™, published by Electronic Arts Inc. of Redwood City, Calif., is an example of a life simulation video game. In The SIMS 3™, a player can create a character for a life simulation and configure its appearance by changing its body type, physical attributes, clothing, or accessories. The player may select from a predefined list of physical attributes such as head size, shoulder width, waist size, etc., or facial features such as the location or size of the eyes, nose, ear, or lips. To make these modifications, the player may access a menu system that presents slider controls on the display of a graphical user interface that can allow the player to make incremental changes to portions of the simulated character based on movement of the slider control.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Figure 1A:
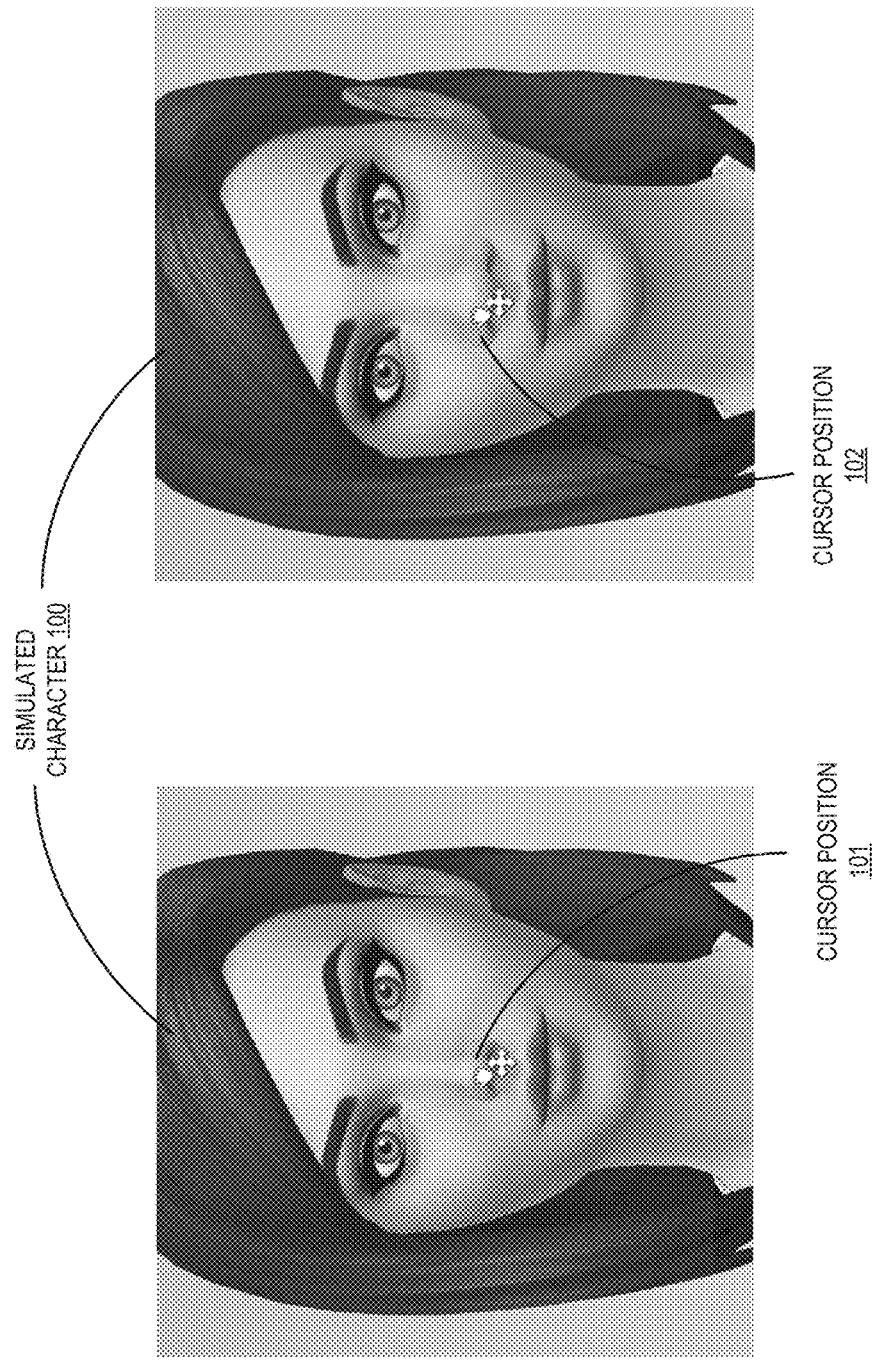
FIG. 1A illustrates an example of direct manipulation of a portion of a simulated character, in accordance with one or more embodiments of the present disclosure.

Described herein are methods and systems for modifying a simulated character by direct manipulation of selected portions of the character. In some implementations, a player of a video game can create a character for a life simulation and configure its appearance by changing its body type, physical attributes, clothing, or accessories. The player may select from a predefined list of physical attributes such as head size, shoulder width, waist size, etc., or facial features such as the location or size of the eyes, nose, ear, or lips. To make these modifications, the player may access a menu system that presents slider controls on the display of a graphical user interface that can allow the player to make incremental changes to portions of the simulated character based on movement of the slider control.

In simulation video games that support a large number of modifiable attributes, this can result significant complexity of the menu system. If each physical feature of a simulated character is assigned a dedicated slider control, the scale of the menu system can lead to a degraded user experience. The player would need to scroll through the list of menu items in order to make a desired modification. Additionally, if the player wanted to revisit that modification, the location of the slider control within the menu system would need to be remembered. Moreover, the player may not necessarily be able to tell what type of modification a particular slider control would invoke just by scrolling through the menu list.

Embodiments of the present disclosure provide the ability to modify portions of a simulated character using direct manipulation of a display of the portions of the simulated character. A user may move a cursor using an input device of a user interface of a simulation video game to identify modifiable portions of a simulated character on a display. The user may then use the input device to directly modify the simulated character by moving the cursor on the display. In an illustrative example, a character manipulation system identifies a portion of a simulated character of a video game available for modification in view of a cursor location associated with a user input device. The simulated character can be presented to a user of the video game via a user interface (e.g., a graphical user interface) for the user to modify. The user may then use a user input device associated with the user interface (e.g., mouse, keyboard, video game controller, virtual reality interface, etc.) to modify the simulated character. The user may use the user input device to move a cursor displayed by the user interface (e.g., change the cursor location) to select portions of the simulated character for modification, to modify the selected portions of the simulated character, to change configuration attributes associated with the simulated character, modify menu selections within the game, or the like.

To identify the portion of the simulated character for modification, the character manipulation system may first determine the cursor location associated with the user input device. In some implementations, the character manipulation system may use mouse picking (e.g., render-based mouse picking) to determine the location of the cursor as presented by the user interface. As the user changes the cursor location (e.g., by using the user input device to move the cursor so that it is displayed over different portions of the simulated character), the character manipulation system can identify predefined areas of the simulated character that can be modified by the user ("hotspots") that are associated with the cursor location (e.g., as the cursor is displayed over the predefined areas on the display of the user interface).

Each hotspot area of a simulated character can represent a portion of the simulated character that can be modified by a user. For example, for a human simulated character, a hotspot may be defined to include the nose area of a simulated character that can allow the user to change the size and shape of the character's nose (e.g., widening/narrowing, lengthening/shortening, etc.). Hotspots may be defined to include other portions of the simulated character such as the ears, eyes, chin, jawline, shoulders, hips, or any other feature of the character that may be customized by the user. Similarly, hotspots can be defined for non-human characters (e.g., animals), machines (e.g., cars) or objects (e.g., shapes) to permit the user to customize physical features of the simulated character.

In some implementations, the hotspot areas of a simulated character may be enabled for selection and modification by the user based on how the character is being displayed to the user. For example, as noted above, a hotspot may be defined based on a particular area of the character (or "region"). A hotspot may be further defined based on the view angle that the character is presented to the user on the display of the user interface. Thus, a hotspot may provide different capability if the character is being displayed to the user so that the user is viewing the character's face as if the character were looking straight at the user (e.g., "front-view") than it would if the character is being displayed from the side (e.g., "profile view"). Additionally, a hotspot may be enabled based on the zoom distance of the view of the character. For example, different hotspots may be enabled when looking at the entire character ("top-level"), zoomed in to view the head ("macro-level"), or further zoomed in to view details of the facial features such as eye size ("micro-level"). Thus, selecting a character's head may present the user with different available modification options depending on how closely the user has zoomed in the view of the character.

To determine the hotspot associated with the cursor location, the character manipulation system may first determine a region identifier of the simulated character based on the location of the cursor over the display of the simulated character. The region identifier can identify the selectable area of the simulated character. In some implementations, the region identifiers for a simulated character can be predefined and stored as an image file associated with the mesh of the simulated character that contains information describing the selectable areas. Each region that may be selected can be stored in the image file associated with the mesh of the simulated character as a unique color. Thus, the nose area of the character could be represented as a different color from the ear area, and thus have a different region identifier. As noted above, the region identifiers may be stored separately from the mesh of the simulated character. Alternatively, the color values may be saved as a part of the mesh of the simulated character.

Once the character manipulation system has identified the image file containing the region information, it may then determine the location in the image that corresponds to the location of the cursor displayed over the simulated character by the user interface. If the region color data is stored separately from the character mesh data, the character manipulation system may use the render-based mouse picking mentioned above (or any similar method of identifying cursor location) to identify the cursor location. The character manipulation system may then use the cursor location over the character to identify the region color value at the corresponding location in the image file. Alternatively, if the region color data is stored as a part of the character mesh, the region color can be identified when the cursor position is determined. The character manipulation system may then identify a selectable area of the simulated character from the color value stored at the location in the image file. Once the region value has been identified, the character manipulation system may then assign the region identifier for the area of the simulated character associated with the location of the displayed cursor using the color information from the image file.

In some implementations, the region values may be stored in the image file as RGB color values. RGB (red, green, and blue) refers to a system for representing colors that may be displayed by a computer system. Red, green, and blue can be combined in various proportions to obtain any color in the visible spectrum. Levels of R, G, and B can each range from 0 to 100 percent of full intensity. Each level is represented by the range of decimal numbers from 0 to 255 (256 levels for each color). Thus three region values may be stored for each location using the separate RGB channels. For example, the R, G, and B channels may store region values associated with three separate modes based on the zoom distance. When identifying the color value with the cursor position, the character manipulation system may obtain all three RGB values simultaneously. The character manipulation system may then select one of the three region values according to the mode identifier (see below).

The character manipulation system may then determine a mode identifier associated with the zoom distance of the simulated character presented by the user interface. As noted above, different hotspots may be activated depending on how closely the display of the user interface is zoomed in to view details of the simulated character. In some implementations, the mode identifiers may include a "top-level" mode (e.g., looking at the entire character), "macro-level" (e.g., zoomed in to view the head), or "micro-level" (e.g., further zoomed in to view details of the facial features). Alternatively, the character manipulation system may include additional mode identifiers to provide greater granularity for manipulation, or fewer mode identifiers to simplify the interface.

As noted above, the character manipulation system may use one of the RGB channels of the image to determine the region. For example, the image's blue channel (B) may correspond to top-level mode, the green channel (G) may correspond to macro-level mode, and the red channel (R) may correspond to micro-level mode. Alternatively, each channel may be configured to correspond to different zoom modes. Thus, different hotspots may be defined for the same area of a simulated character. For example, in macro-level mode, the entire nose may be a single hotspot, while in micro-level mode, the tip of the nose, the nostrils, and the bridge of the nose may have different hotspots in order to provide additional granularity for manipulation.

The character manipulation system may then determine a view angle identifier associated with the viewable angle of the simulated character presented by the user interface. As noted above, different hotspots may be activated depending on the view angle of the simulated character presented to the user by the user interface. A simulated character may be displayed to the user in the user interface in one of many different view angles, as if the simulated character were placed on a moving pedestal that could be rotated in predefined increments to show the entire character as the pedestal rotates. The view angles can be configured as uniform portions (or "pie-wedges") of the entire 360 degree circular rotation of the pedestal. For example, the character manipulation system may be configured with view angles including "front-view" (e.g., as if the character were looking straight at the user), "profile" (e.g., displaying the character from the side), "rear-view" (e.g., displaying the character from behind), or any increment in between. Alternatively, the view angles can be configured as portions of a globe in order to provide viewable angles along multiple visual planes (e.g., to provide "top-down" and "bottom-up" views of an object or character.

The character manipulation system may then identify a hotspot resource data structure using the region identifier, mode identifier, and view angle identifier. In some implementations, the hotspot resource data structure may be a database accessible to the character manipulation system. Alternatively, the hotspot resource data structure may be stored in a memory space accessible to the character manipulation system. The character manipulation system may use the combination of identifiers to execute a database lookup for an available hotspot that matches the identifiers. The hotspot resource data structure can store information that can control when a hotspot is available for selection (region/mode/view angle combination), how the hotspot is displayed to the user (e.g., highlight textures that may be applied as a visual indicator to the user of the available hotspot), the type of modification that is available for the user to perform (e.g., widening or narrowing the nose vs. shortening or lengthening the nose), or the like. The character manipulation system can then use the information in the hotspot resource data structure to display the hotspot to the user and control the modifications that the user may make to the area of the simulated character associated with the hotspot.

Once the hotspot resource data structure has been identified, the character manipulation system may identify a highlight texture to be displayed as a visual indicator for the hotspot area. In some implementations, a highlight texture may be stored as a separate mesh that only includes the area of simulated character associated with the hotspot. Thus, each hotspot can have its own highlight texture. The highlight texture may be displayed over the simulated character to accentuate the hotspot area on the display of the user interface so that the user may easily identify the hotspot. For example, the highlight texture may be a wireframe grid of the hotspot area in a bright color that makes the hotspot area stand out on the display.

As the hotspot is identified as the cursor is moved over the simulated character on the display, the character manipulation system may display a visual indicator for the hotspot area to provide feedback to the user on what portions of the simulated character can be manipulated and what type of operations can be performed. The character manipulation system may overlay the highlight texture over the hotspot as noted above. Additionally, the character manipulation system may change the appearance of the cursor to indicate the available actions the user may take to modify the area of the simulated character encompassed by the hotspot. For example, the cursor icon may be modified to indicate that the user may move the identified portion of the simulated character (e.g., by displaying arrow pointing in a particular direction), rotate the identified portion of the simulated character (e.g., by displaying an arrow that forms a circular shape), scale the size of the identified portion of the simulated character (e.g., by presenting a diagonal arrow with small boxes increasing in size), or the like.

The character manipulation system may then select the identified portion of the simulated character for modification. The selection may be invoked by a user interacting with the input device of the user interface. For example, as the user passes the cursor over the displayed simulated character using a mouse, the character manipulation system can display the highlight textures over each identified hotspot associated with the cursor location as it moves across the display. If the user decides to select one of the identified hotspots to modify the character, the user may use the mouse to invoke the selection (e.g., by clicking one of the mouse buttons). The character manipulation system may then receive the input from the input device to select the identified hotspot area of the simulated character for modification.

A hotspot area may include different available modification options (or "modifier action") based on how the character is being displayed to the user. For example, if the character is being displayed in "front-view" the hotspot may permit the user to widen or narrow the nose. If the character is being displayed in "profile view", the hotspot may permit the user to lengthen or shorten the nose. The modifier action can include the changes that may be made to the geometry of the hotspot area. Since the modifier action is tied to the hotspot (via the hotspot resource data structure) a particular cursor movement may invoke one type of change for one hotspot, but an entirely different change in another. For example, when viewing the character's nose from "front-view" a side-to-side movement of the cursor (e.g., by moving a mouse) can widen or narrow the nose. In profile view, the different view angle results in the selection of an entirely different hotspot, and thus the same side-to-side cursor movement may invoke an entirely different modifier (e.g., to shorten or elongate the nose).

The modifier action can also be configured so that cursor movement can manipulate the hotspot area in more than one direction. For example, a diagonal movement of the cursor can manipulate a portion of the simulated character in two planes (e.g., making the nose wider and higher on the face at the same time). Additionally, a modifier action can be configured so that a particular cursor movement when combined with additional input from the input device can modify the hotspot area in an alternative manner. For example, character manipulation system can prevent modification of the hotspot in two directions if the user holds down a key on the keyboard while dragging the mouse. Thus, in the diagonal movement example above, if the user holds down the key while dragging the mouse diagonally, the nose may be modified in only one direction rather than two.

The character manipulation system may determine the modifier action for the selected hotspot area according to the information stored in the hotspot resource data structure. The modifier action can be associated with an underlying deformation data structure (stored separately from the hotspot resource data structure) that can control the available deformations that can be made to the geometry of the simulated character. For example, the modifier action may be associated with a deformation map, blend shape/morph target, bone delta structure, or any similar data structure that can maintain the deformations that can be applied to the simulated character. In some implementations, additional tuning information may be stored with the modifier action in the hotspot resource data structure to control the limits to which particular hotspots may be modified. In some implementations, the tuning information may be configured for different age groups to limit the size or shape of body modifications that can be made to the character. For example, the tuning file may be configured so that the length of the nose for a teen can only be modified to 80% of the maximum length of that for an adult.

Once the modifier action has been determined, the character manipulation system may then map the modifier action to a particular change in cursor location (e.g., a particular cursor movement received from an input device) that can invoke the modifier action. The character manipulation system may then determine a cursor display type associated with the modifier action according to the information in the hotspot resource data structure, and subsequently modify the cursor display using the cursor display type. For example, as noted previously, if the user has selected the hotspot to modify the nose in "front-view" the modifier action to narrow or widen the nose may be mapped to a side-to-side movement of the cursor, and the cursor display may be modified to show a side-to-side arrow with the cursor icon.

The character manipulation system may subsequently modify the selected portion of the simulated character according to a direct manipulation of the selected portion of the simulated character by a user using the user input device. The character manipulation system may first receive a change in the cursor location while the hotspot area of the simulated character has been selected. For example, the user may use the input device to select the hotspot (e.g., by clicking and holding a mouse button) and move the cursor location by dragging the cursor to directly manipulate the selected hotspot (e.g., by dragging the mouse while holding the mouse button). The character manipulation system can then modify the hotspot area of the simulated character by invoking the associated modifier action based on the change in the cursor location. For example, as the user drags the cursor, the character manipulation system can deform the area of the hotspot selected by the user as if the user were pulling the hotspot itself.

The character manipulation system can continue to deform the hotspot until the user stops dragging the cursor, releases control of the input device (e.g., by ceasing to hold down the mouse button), or the maximum level of deformation of the hotspot has been reached. In some implementations, the character manipulation system can provide visual or audible indictors to notify a user that the maximum level of modification is being approached based on the movement of the cursor, and also when the maximum level of modification has been reached. For example, the character manipulation system can highlight the hotspot in a different color (e.g., yellow) when the deformation of the hotspot is approaching the maximum. The character manipulation system may also slow (or dampen) the movement of the cursor as the deformation approaches the maximum. The character manipulation system can also highlight the hotspot in a different color (e.g., red) when the maximum deformation has been reached. Alternatively, the character manipulation system may produce an audible alert, a force feedback signal to the input device (e.g., send a signal to the mouse or game controller to vibrate), send a message to the display, or the like.

To do so, the character manipulation system may first determine a maximum displacement value that may be applied to the hotspot. In some implementations, the maximum displacement is stored in the deformation data structure noted above. As the hotspot is being manipulated (e.g., while the hotspot area has been selected and is being modified by the movement of the cursor), the character manipulation system may then determine whether the change in the cursor location in relation to the maximum displacement value has met a predetermined threshold. If so, the character manipulation system can send an indicator or notification to the user interface that the predetermined threshold has been met. As noted above, the indicator or notification can include a different color highlight of the hotspot, an audible alert, a message displayed on the screen, a force-feedback signal to the user input device, slowing the speed of cursor movement on the display, or any other manner of alerting the user. Once the maximum displacement has been reached, the character manipulation system may display a different indicator or notification to the user interface that the predetermined threshold has been met. As noted above, the indicator or notification can include a different color highlight of the hotspot, an audible alert, a message displayed on the screen, a force-feedback signal to the user input device, preventing further cursor movement on the display, or any other manner of alerting the user.

The character manipulation system may receive additional input from an input device to further modify the hotspot area of the simulated character. As noted above, the additional input can be the pressing or holding keys on a keyboard, invoking the scroll wheel of a mouse, a voice command, pressing a game controller button, or the like. The additional input can be received such that it does not change the cursor location (e.g., pressing a key on the keyboard while using the mouse to change the cursor location. The character manipulation system can be configured so that the additional input may implement a modification of a hotspot that is not available in the present view of the hotspot. The main modifier action can be mapped to the cursor movement, and a supplemental modifier action can be assigned to the additional input. For example, if the current view of the character is the "front-view" and the user is widening the nose using a side-to-side mouse drag, the user may use the scroll wheel to elongate the nose at the same time (which would otherwise only be available in "profile view").

Embodiments of the present disclosure are thus capable of providing the ability to modify portions of a simulated character using direct manipulation of a display of the portions of the simulated character. This can eliminate the need for complex menu control systems to make modifications to the physical attributes of a simulated character, thereby dramatically improving the user experience. Additionally, this can reduce the memory required to support a simulation application since the menu structure will not be required. Further, since the modifier actions are data driven by the hotspot resource data structure, additional modification actions can be added to a simulation video game at the data structure level without the need to add new menu slider options or make other software reconfiguration changes to provide the user with the appropriate functionality.

Figure 1B:
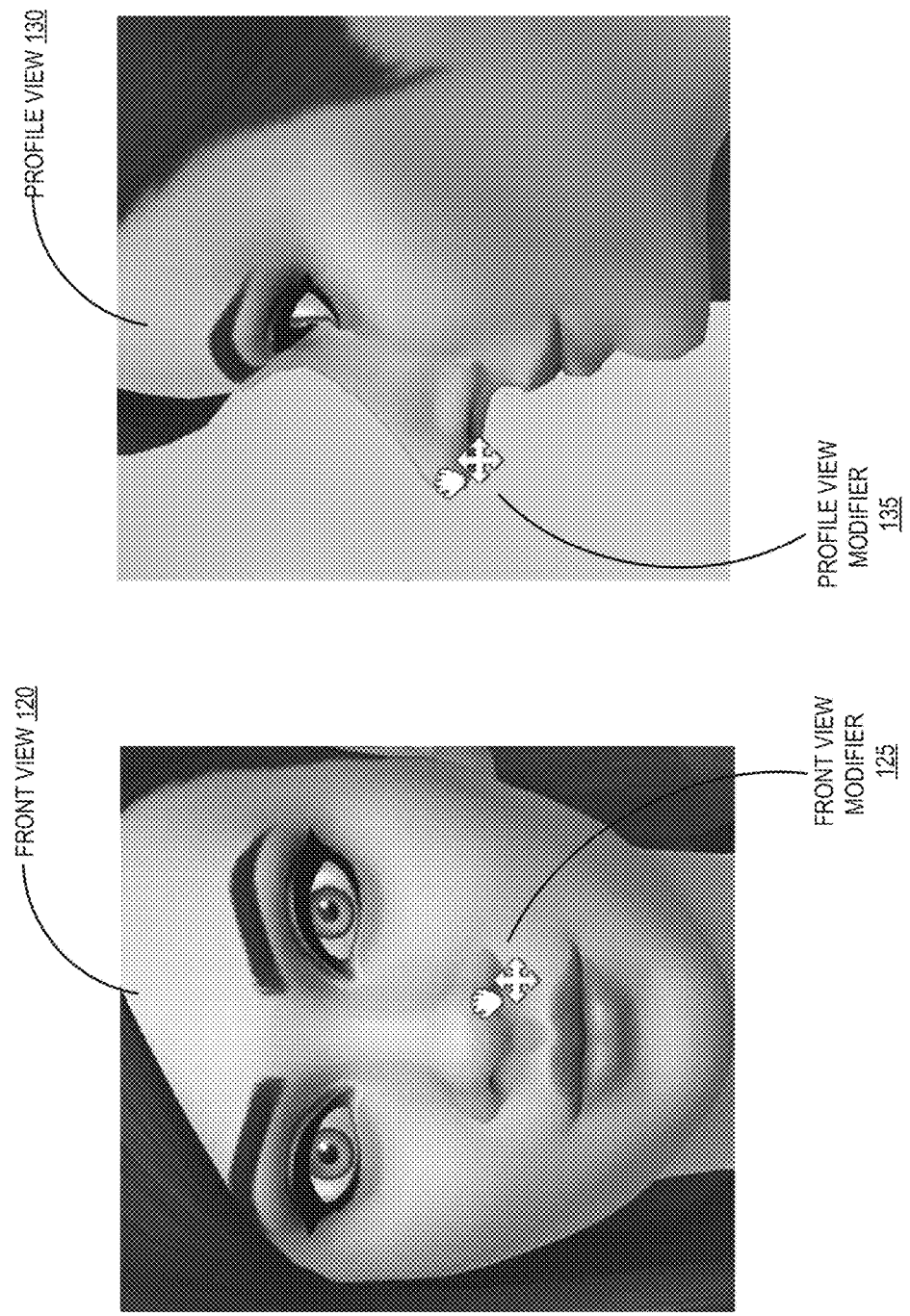
FIG. 1B illustrates an example of direct manipulation of a portion of a simulated character based on the display view, in accordance with one or more embodiments of the present disclosure.

FIGS. 1A-1B illustrate examples of direct manipulation of a portion of a simulated character. FIG. 1A illustrates an example of direct manipulation of a portion of a simulated character in a single display view. Simulated character 100 is shown before and after the direct manipulation of the hotspot that includes the nose of the simulated character. Cursor position 101 shows the location of the cursor as a user moves the cursor over the top of the nose before selecting and modifying that portion of simulated character 100. Cursor position 102 shows the location of the cursor after the user has clicked on the nose hotspot and dragged the cursor to the left, causing the direct manipulation of the nose hotspot. The result as shown in FIG. 1A is the widening of the nose hotspot for simulated character 100.

FIG. 1B illustrates an example of direct manipulation of a portion of a simulated character based on the display view. Front view 120 shows the manipulation of the nose hotspot from FIG. 1A where the nose of simulated character 100 has been widened. Front view modifier 125 shows that viewing simulated character 100 in front view can assign the side-to-side movement of the mouse over the nose hotspot to a widening modifier action. Profile view 130 shows the view of simulated character 100 from the profile view. Profile view modifier 135 shows that viewing simulated character 100 in profile view can assign the side-to-side movement of the mouse over the nose hotspot to a lengthening modifier action. While only two views have been depicted, one of ordinary skill in the art will appreciate that the described embodiments of the present disclosure may be applied to multiple views of simulated character 100.

Figure 2A:
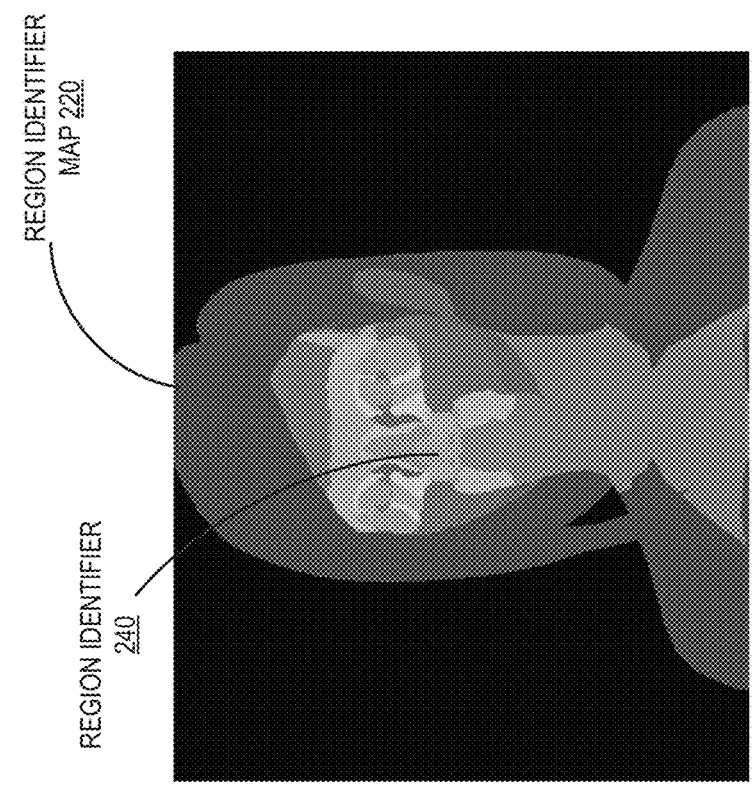
FIG. 2A illustrates an example of a wireframe mesh associated with a simulated character and a corresponding region identifier map image, in accordance with one or more embodiments of the present disclosure.
Figure 2A:
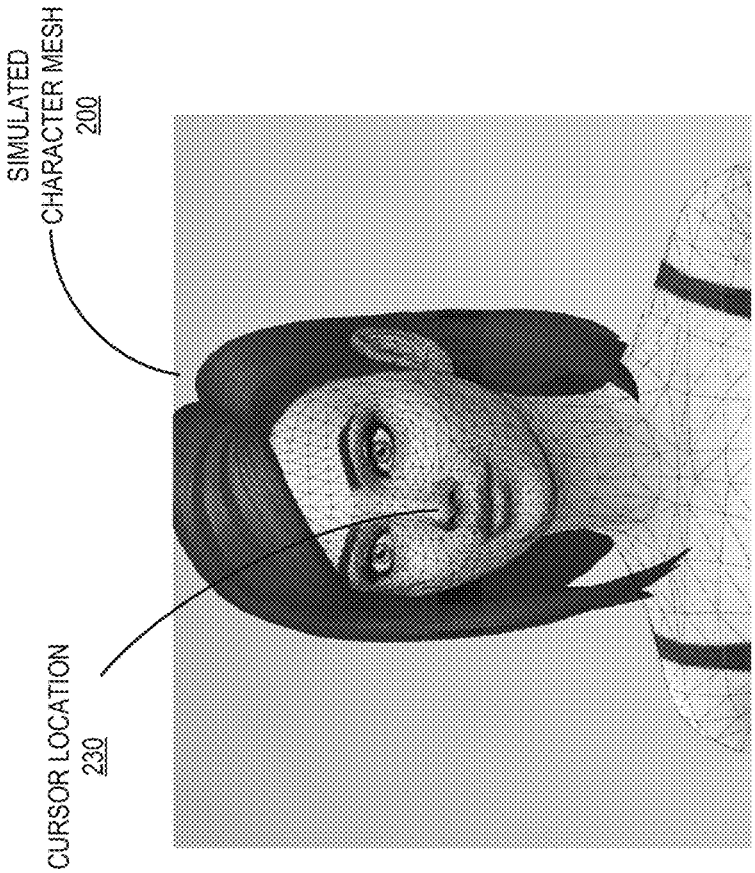
Figure 2B:
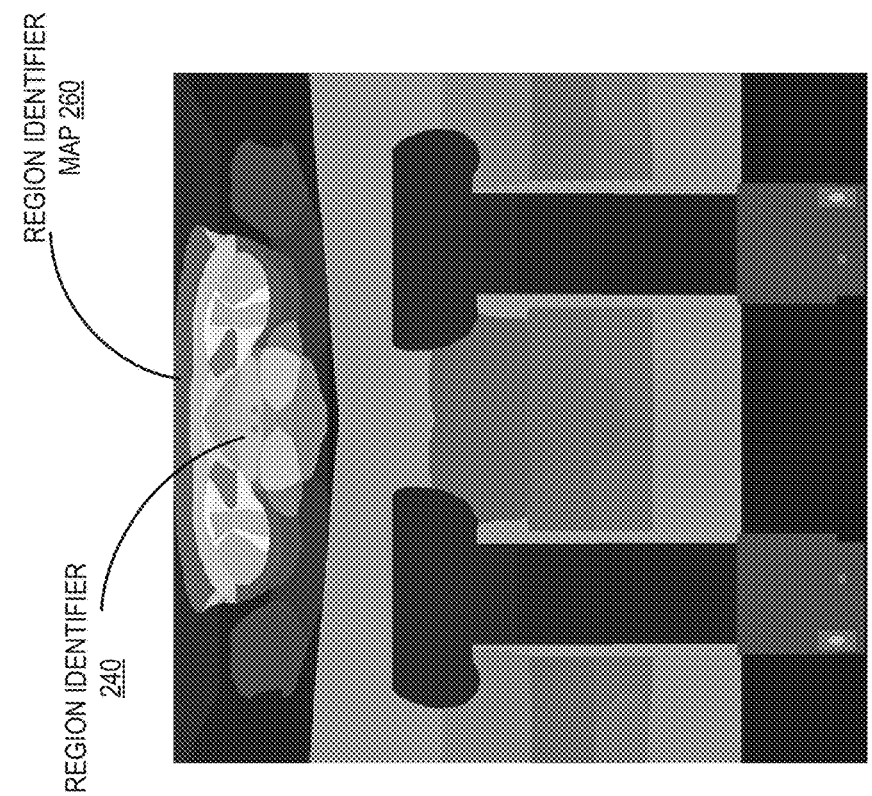
FIG. 2B illustrates an example of a wireframe mesh associated with a simulated character and a corresponding region identifier map image, in accordance with one or more embodiments of the present disclosure.
Figure 2B:
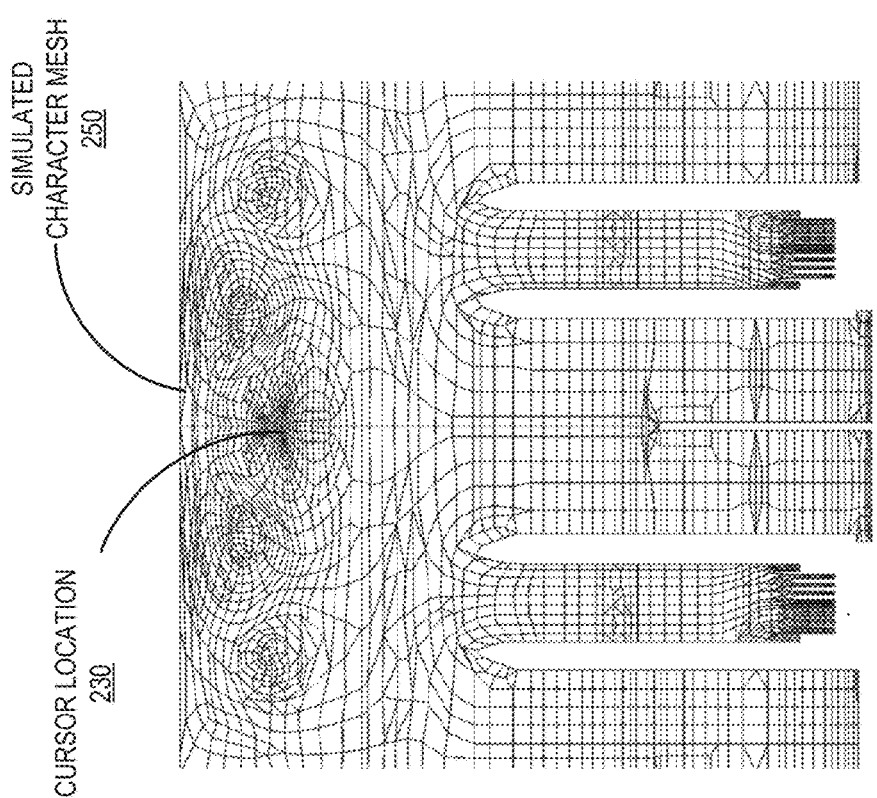

FIGS. 2A-2B illustrate an example of a wireframe mesh associated with a simulated character and a corresponding region identifier map image. In FIG. 2A, each cursor location 230 from character mesh 200 can have a corresponding region identifier location 240 in region identifier map 220. As noted above, as a user moves a cursor over a simulated character, the cursor location 230 can be determined by using mouse picking or other similar method. Since region identifier map 220 is constructed using the same mesh structure as character mesh 200, the value for cursor location 230 can be used to identify region identifier 240. The color value at region identifier 240 can represent the unique value for the region of the simulated character that may be modified by the user.

FIG. 2B illustrates the same simulated character mesh 200 and region identifier map 220 from FIG. 2A as two dimensional representations of three dimensional renderings. If the simulated character is regarded as a 3-dimensional wireframe mesh that is analogous to the character's skin, the simulated character mesh 250 and region identifier map 260 can be regarded as depictions of the character's skin if it were unpeeled from the character's body and pressed flat on a 2-dimensional surface. Each 3-dimensional polygon vertex of the simulated character thus has a corresponding location on the 2-dimensional surface of the simulated character mesh 250 and region identifier map 260 map.

Figure 3A:
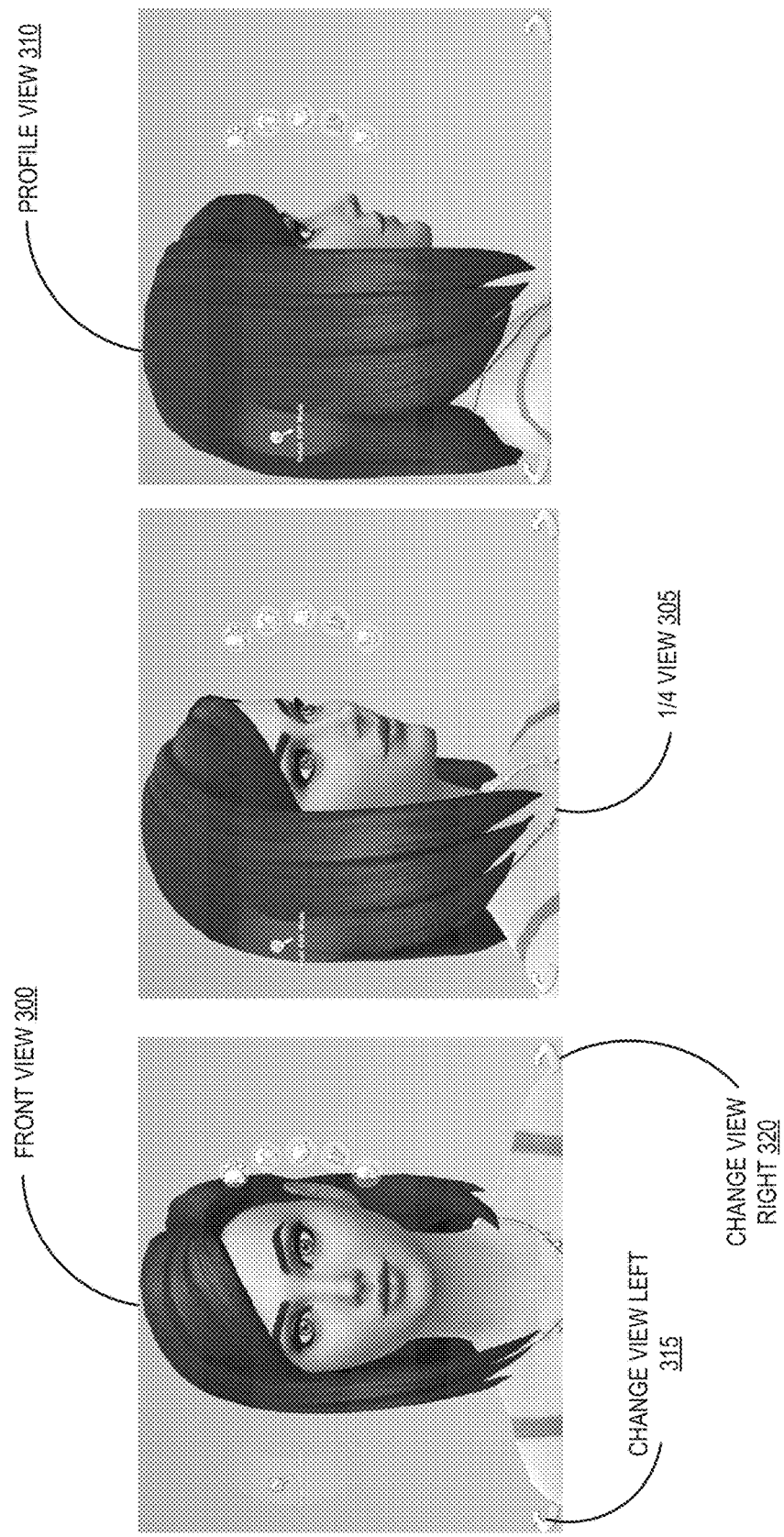
FIG. 3A illustrates examples of display views of a simulated character, in accordance with one or more embodiments of the present disclosure.

FIG. 3A illustrates examples of display views of a simulated character. Front view 300 shows the simulated character as if the character were looking straight at the user. If the user selects the change view left 315 element, the user interface may show the next available display view. In FIG. 3A, the next view is ¼ view 305, which shows the view interval between front view 300 and profile view 310. Selecting change view left 315 again may show the next available display view, which in FIG. 3A is profile view 310. Profile view 310 shows the simulated character as if the character were being viewed from the side. Additional selection of either change view left 315 or change view right 320 can rotate the character view predefined increments.

Figure 3B:
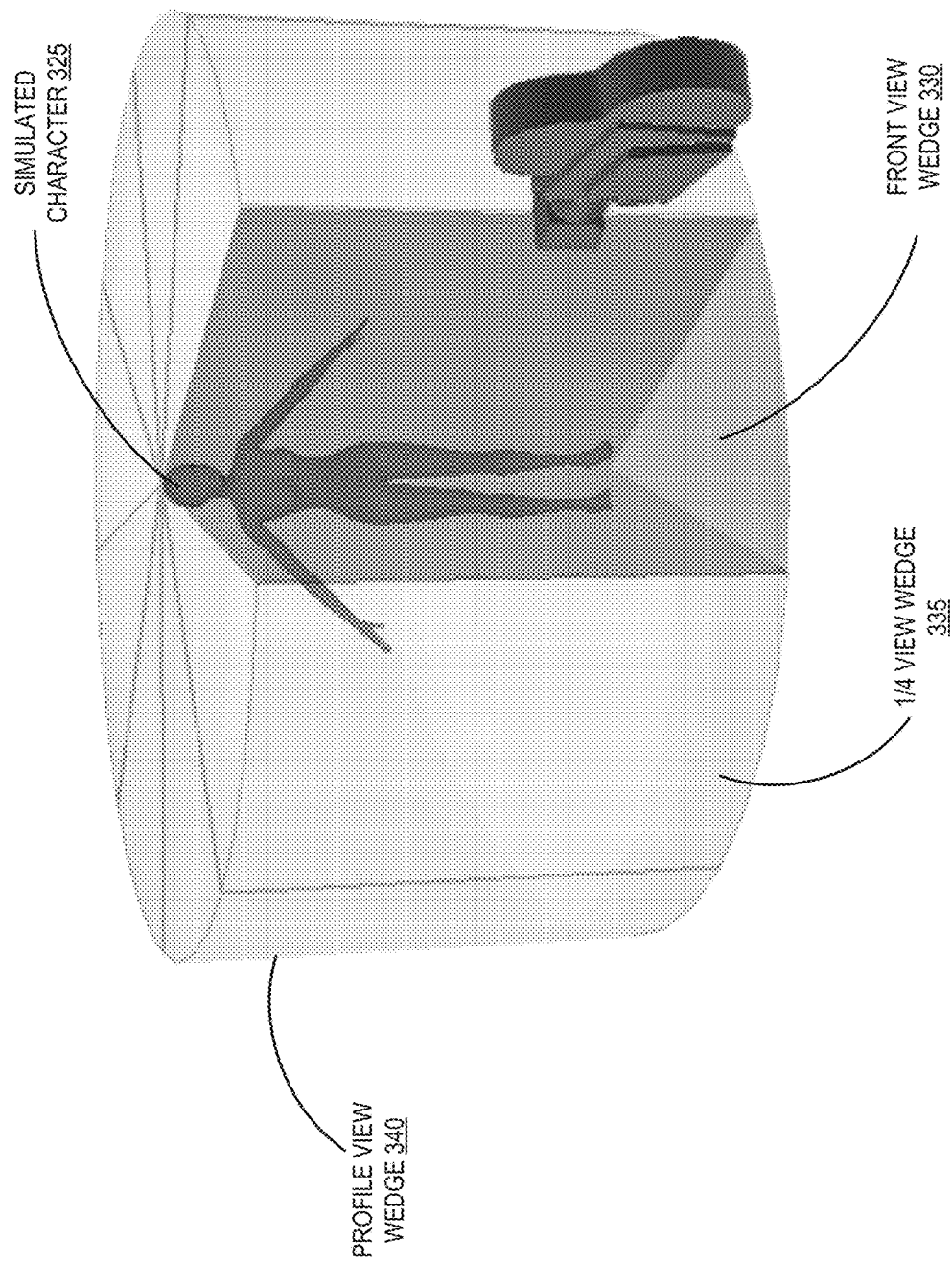
FIG. 3B illustrates an example of a display view configuration, in accordance with one or more embodiments of the present disclosure.

FIG. 3B illustrates an example of a display view configuration represented in a pie wedge format. Simulated character 325 may be displayed to the user in the user interface in one of many different view angles, as if the simulated character 325 were placed on a moving pedestal that could be rotated in predefined increments to show the entire character as the pedestal rotates. The view angles can be configured as uniform portions (or "pie-wedges") of the entire 360 degree circular rotation of the pedestal. For example, the available view angles can include front view wedge 330 (e.g., as if the character were looking straight at the user), "profile" (e.g., displaying the character from the side), ¼ view wedge 335 (e.g., the wedge between front view wedge 330 and profile wedge 340), profile view wedge 340 (e.g., displaying the character from the side), or any increment within the 360 degree circle.

It should be noted that while FIGS. 3A-3B illustrate only selected display views, one of ordinary skill in the art would appreciate that the described embodiments of the present disclosure are not limited only to these views, and thus may be applied to a different number of display views.

Figure 4:
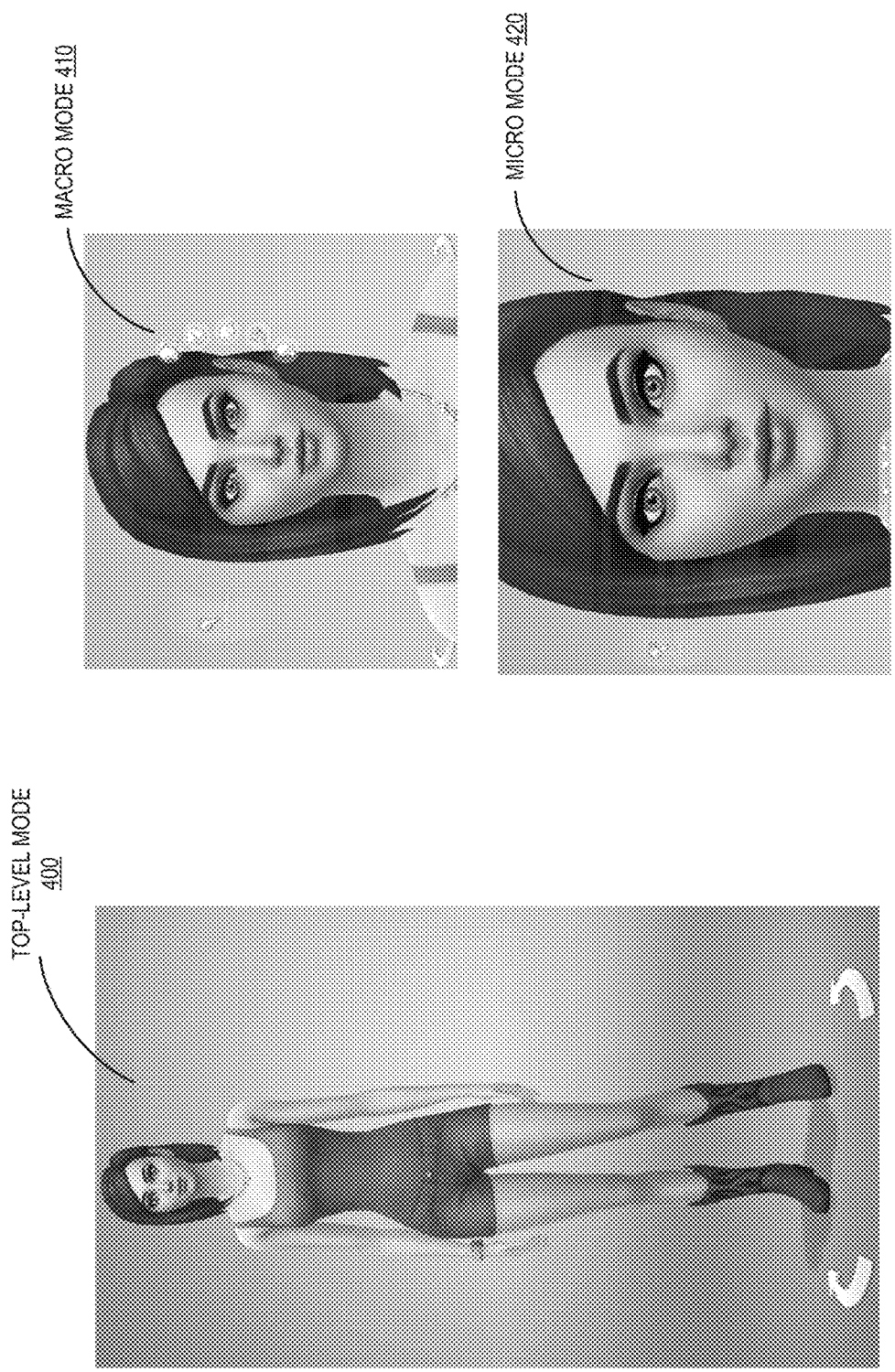
FIG. 4 illustrates examples of display modes of a simulated character based on zoom distance, in accordance with one or more embodiments of the present disclosure.

FIG. 4 illustrates examples of display modes of a simulated character based on zoom distance. Top level mode 400 shows the entire character. In top level mode 400, a user may modify elements of the simulated character such as head size, shoulder width, hip width, leg size, etc. Selecting a menu item, command, or icon in the user interface can zoom in on the character to macro mode 410 that shows a zoomed in view of the head. In macro mode 410, the user may modify some elements of the simulated character's face such as ear, nose, eye, or lip position or width. The user may zoom in further to micro mode 420 to view details of the facial features such as eye size, pupil size, eyelid size, etc. It should be noted that while FIG. 4 illustrates the different display modes in front view, one of ordinary skill in the art would appreciate that the described embodiments of the present disclosure are not limited only to this views, and thus may be applied to a different number of display views.

Figure 5A:
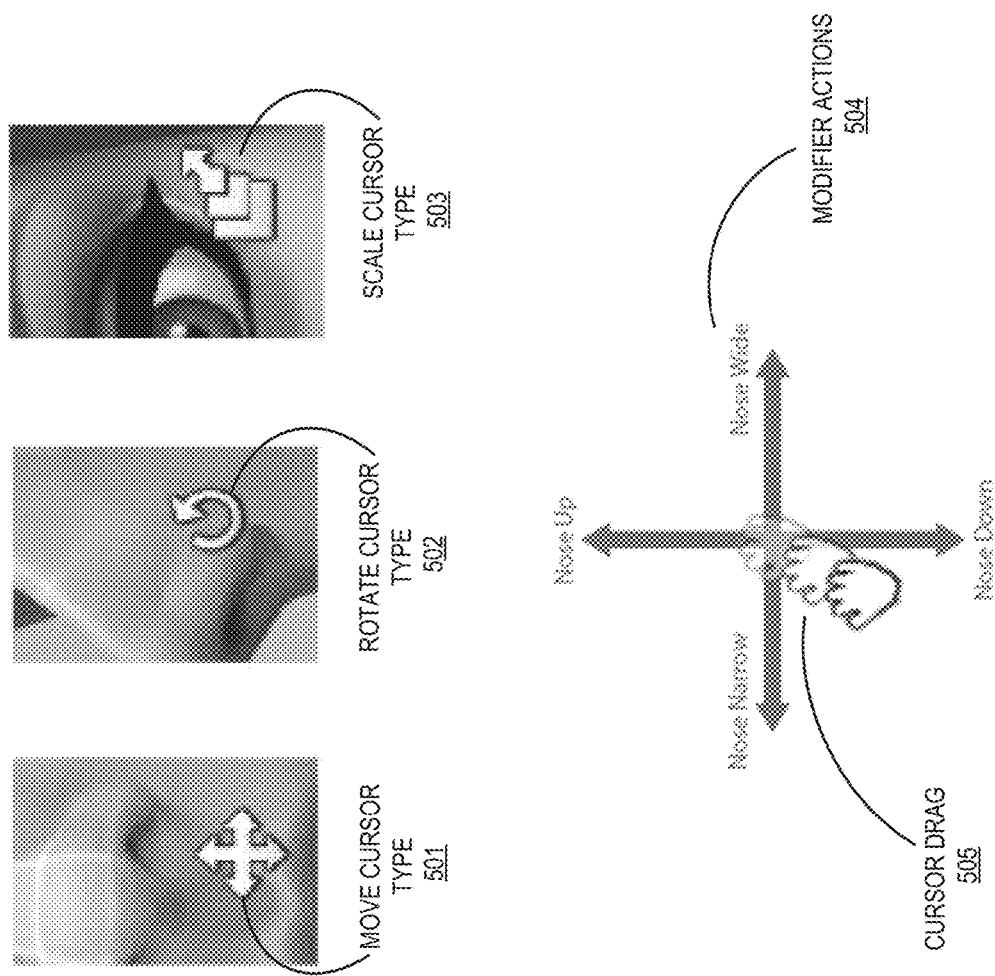
FIG. 5A illustrates examples of cursor display types and modifier actions, in accordance with one or more embodiments of the present disclosure.

FIG. 5A illustrates examples of cursor display types and modifier actions. Move cursor type 501 shows the cursor type that may be displayed for a modifier action that is invoked for a side-to-side movement of the cursor such as for widening or lengthening the nose. Rotate cursor type 502 shows the cursor type that may be displayed for a modifier action that is invoked for applying a rotational modification to a hotspot such as rotating the tip of the nose up or down.

Scale cursor type 503 shows the cursor type that may be displayed for a modifier action that is invoked for applying an increase or decrease in the scale size of a hotspot such as increasing the size of the eye.

Modifier actions 504 illustrates a diagram of possible modifier actions mapped to a change in cursor location when a hotspot is selected. As shown, in FIG. 5A, modifier actions 504 is mapped to a hotspot assigned to the nose, where vertical movement of the cursor (e.g., by moving a mouse) up can move the nose of the simulated character up on the face and movement of the cursor down can move the nose down on the face. Similarly, cursor movement horizontally to the right can make the nose wider, and cursor movement horizontally to the left can make the nose narrower. Cursor drag 505 illustrates a simulated selection of a hotspot and dragging of the cursor downward and to the left, which could result in moving the nose on the face of the simulated character down and to the left of its original position on the simulated character's face.

Figure 5B:
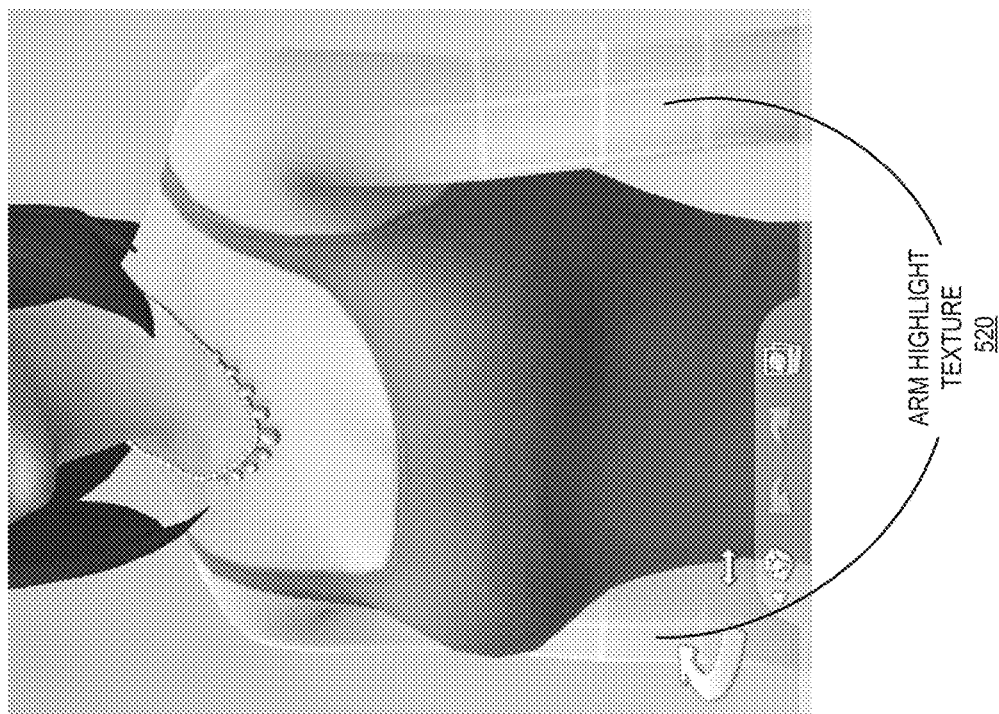
FIG. 5B illustrates examples of display highlight textures, in accordance with one or more embodiments of the present disclosure.
Figure 5B:
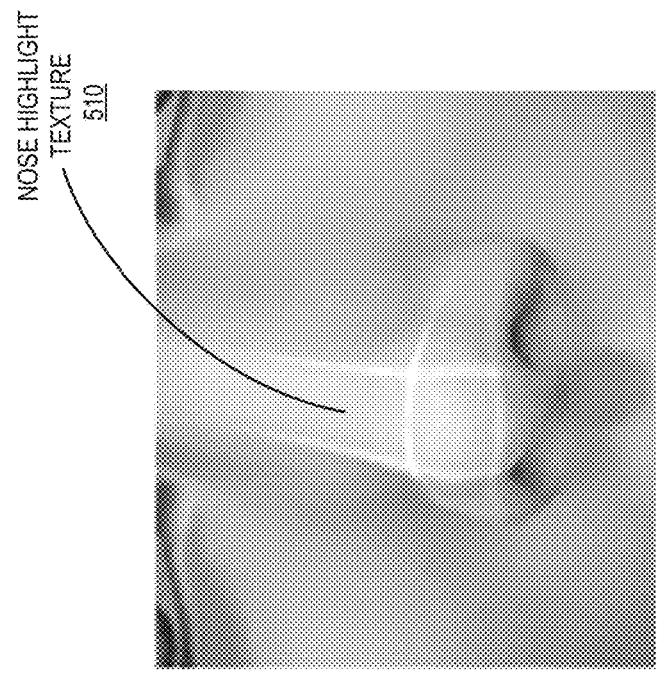

FIG. 5B illustrates examples of display highlight textures applied to hotspots on a simulated character. Nose texture highlight texture depicts an example of a wireframe grid that may be displayed over the nose of a simulated character when the cursor is placed over the nose. Arm highlight texture 520 depicts an example of a wireframe grid that may be displayed over the arms of a simulated character when the cursor is placed over either arm.

It should be noted that while FIGS. 1A-5B illustrate a particular simulated character, one of ordinary skill in the art would appreciate that the described embodiments of the present disclosure are not limited only to this particular character, and thus may be applied to different types of simulated characters (both human and non-human), or other simulated elements that may be present in a graphical simulation such as machines (e.g., cars), structures (e.g., buildings), or objects (e.g., shapes). Additionally, while embodiments of the present disclosure have been described with respect to a simulated character of a video game, one of ordinary skill in the art would appreciate that the described embodiments of the present disclosure are not limited to video games, and thus may be applied to any computer program that can display simulated characters, machines, or objects. Illustrative examples can include immersive simulations (virtual reality simulations), architectural design simulations, fashion design simulations, automotive customization simulations, and the like.

Figure 6:
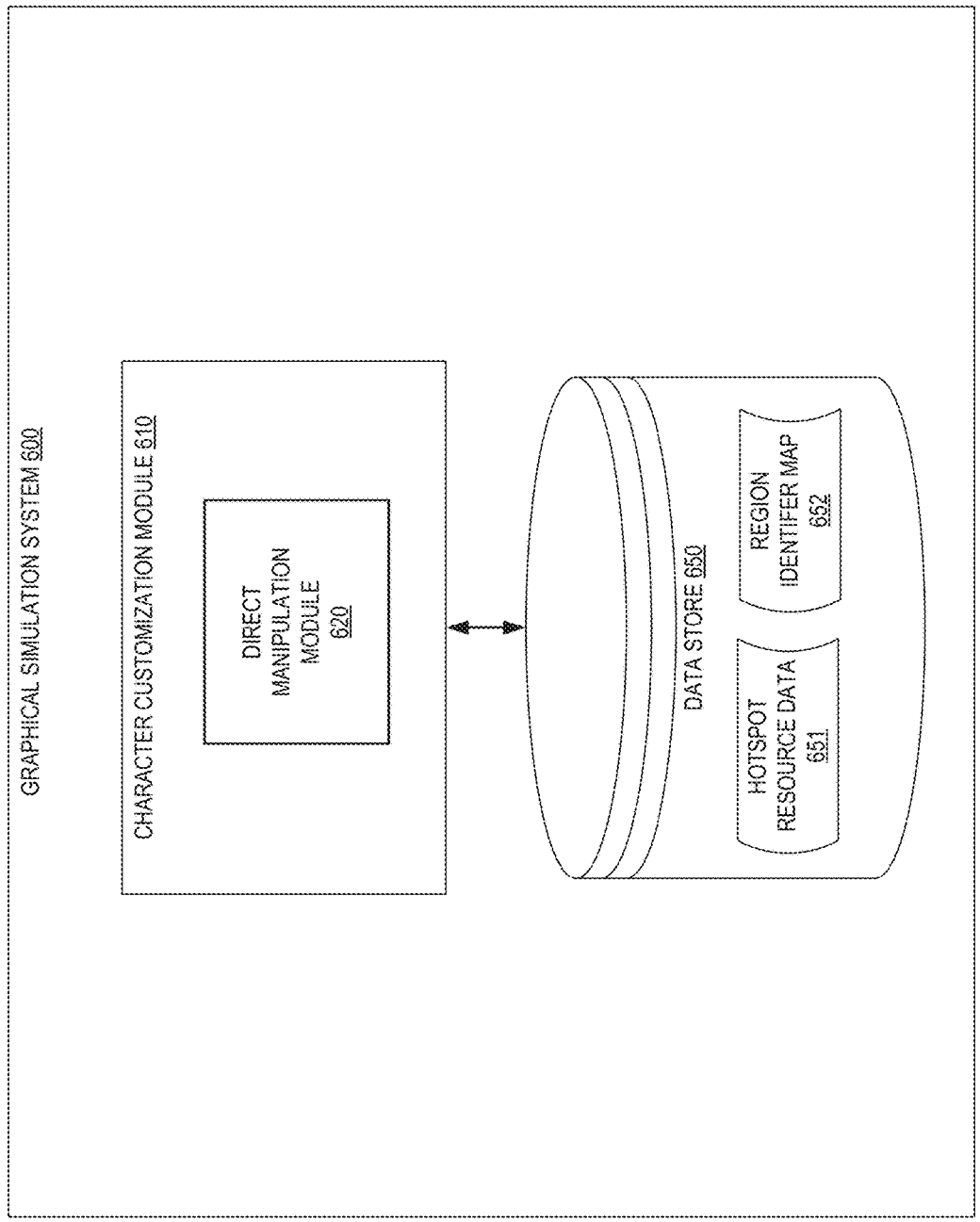
FIG. 6 depicts a high-level component diagram of an example graphical simulation system architecture, in accordance with one or more embodiments of the present disclosure.

FIG. 6 depicts a high-level component diagram of an illustrative example of a graphical simulation system 600, in accordance with one or more embodiments of the present disclosure. One skilled in the art will appreciate that other architectures for graphical simulation system 600 are possible, and that the implementation of a computer system utilizing examples of the invention are not necessarily limited to the specific architecture depicted by FIG. 6.

As shown in FIG. 6, the graphical simulation system 600 may include a character customization module 610 and a data store 650 (e.g., one or more magnetic hard disk drives, a Universal Serial Bus [USB] solid state drive, a Redundant Array of Independent Disks [RAID] system, a network attached storage [NAS] array, etc.). The graphical simulation system 600 may be a server, a mainframe, a workstation, a personal computer (PC), a mobile phone, a palm-sized computing device, etc. Graphical simulation system can generate and maintain simulated characters for use in a video game. For example, graphical simulation system can be accessed by a user via a graphical user interface to create a simulated character for use in a video game. Alternatively, graphical simulation system may be used as a runtime component of a video game, providing real time modifications to simulated characters during execution of the video game (meaning, graphical conflicts between assets associated with a simulated character may be resolved as they occur during the execution of the simulation video game).

Character customization module 610 can manage customization of physical features associated with a simulated character. In certain implementations, character customization module 210 may be invoked by a graphical user interface to select physical attributes of a simulated character. For example, a user interface may permit a user to modify age, body type, hair color, etc.

Character customization module may additionally include direct manipulation module 620 that can allow the user to directly manipulate portions of the simulated character, as described in detail below with respect to FIGS. 7-12. It should be noted that in some alternative implementations, direct manipulation module 620 may be external to character customization module 610, rather than embedded within character customization module 610, or may replace character customization module 610.

Data store 650 can store information related to portions of a simulated character that may be modified in a video game. Data store 650 may include hotspot resource data 651, which can store the data for each hotspot available for a simulated character in graphical simulation system 600. Data store 650 may additionally include region identifier map 652, which can store the region identifier mappings for the hotspots for simulated characters. Information from data store 650 can be accessed by direct manipulation module 620 to modify the simulated character using direct manipulation, as described in detail below with respect to FIGS. 7-12.

Figure 7:
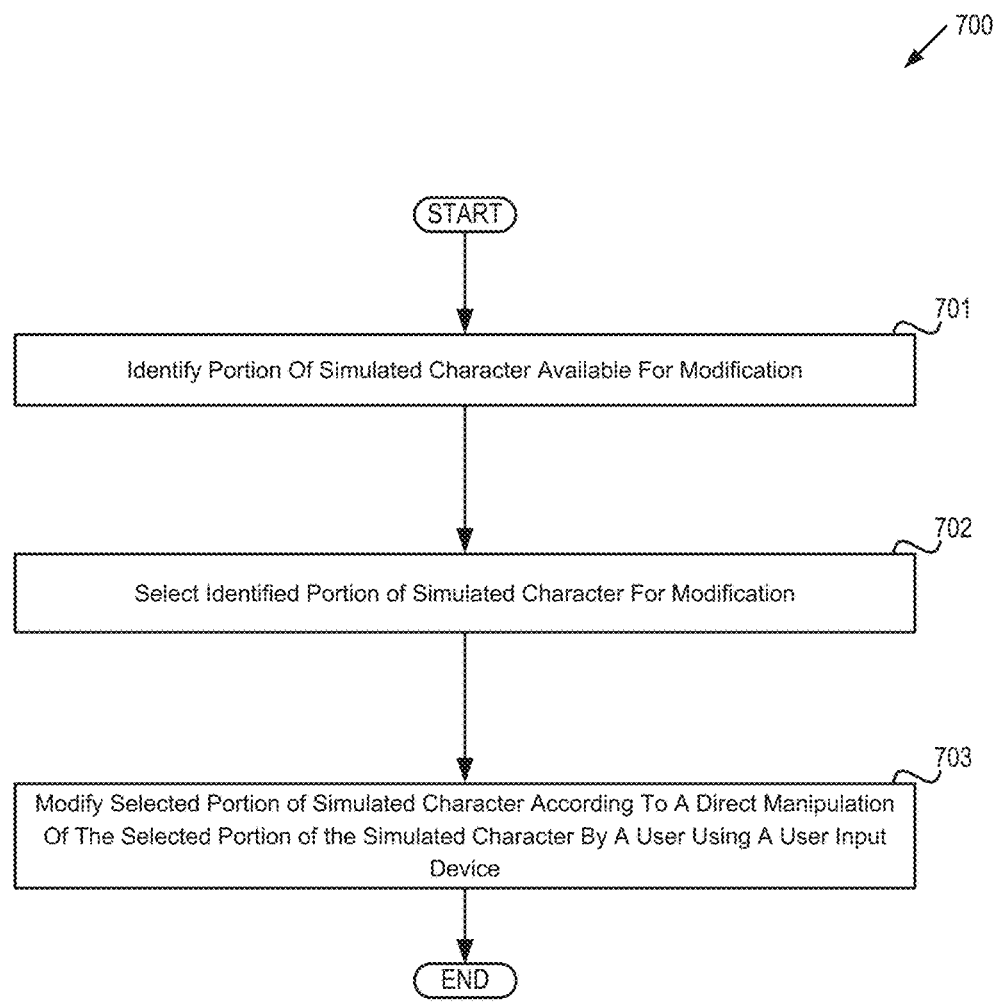
FIG. 7 depicts a flow diagram of a method for modifying a simulated character by direct manipulation, in accordance with one or more embodiments of the present disclosure.

FIG. 7 depicts a flow diagram of an example method 700 for modifying a simulated character by direct manipulation. The method may be performed by processing logic that may comprise hardware (circuitry, dedicated logic, etc.), software (such as is run on a general purpose computer system or a dedicated machine), or a combination of both. In one illustrative example, method 700 may be performed by direct manipulation module 620 in FIG. 6. Alternatively, some or all of method 700 might be performed by another module or machine. It should be noted that blocks depicted in FIG. 7 could be performed simultaneously (at least partially overlapping in time) or in a different order than that depicted.

At block 701, processing logic identifies a portion of a simulated character available for modification. The simulated character can be presented to a user of the video game via a user interface (e.g., a graphical user interface) for the user to modify. The user may then use a user input device associated with the user interface (e.g., mouse, keyboard, video game controller, virtual reality interface, etc.) to modify the simulated character. The user may use the user input device to move a cursor displayed by the user interface (e.g., change the cursor location) to select portions of the simulated character for modification, to modify the selected portions of the simulated character, to change configuration attributes associated with the simulated character, modify menu selections within the game, or the like. In an illustrative example, processing logic may identify the portion of the simulated character as described in further detail below with respect to FIG. 8.

At block 702, processing logic selects the identified portion of the simulated character for modification. The selection may be invoked by a user interacting with the input device of the user interface. For example, as a user passes the cursor over the displayed simulated character using a mouse, processing logic can display the highlight textures over each identified hotspot associated with the cursor location as it moves across the display. If the user decides to select one of the identified hotspots to modify the character, the user may use the mouse to invoke the selection (e.g., by clicking one of the mouse buttons). In an illustrative example, processing logic may select the identified portion of the simulated character as described in further detail below with respect to FIG. 11.

At block 703, processing logic modifies the selected portion of the simulated character according to a direct manipulation of the selected portion of the simulated character by a user using a user input device. In an illustrative example, processing logic may modify the selected portion of the simulated character as described in further detail below with respect to FIG. 12. After block 703, the method of FIG. 7 terminates.

Figure 8:
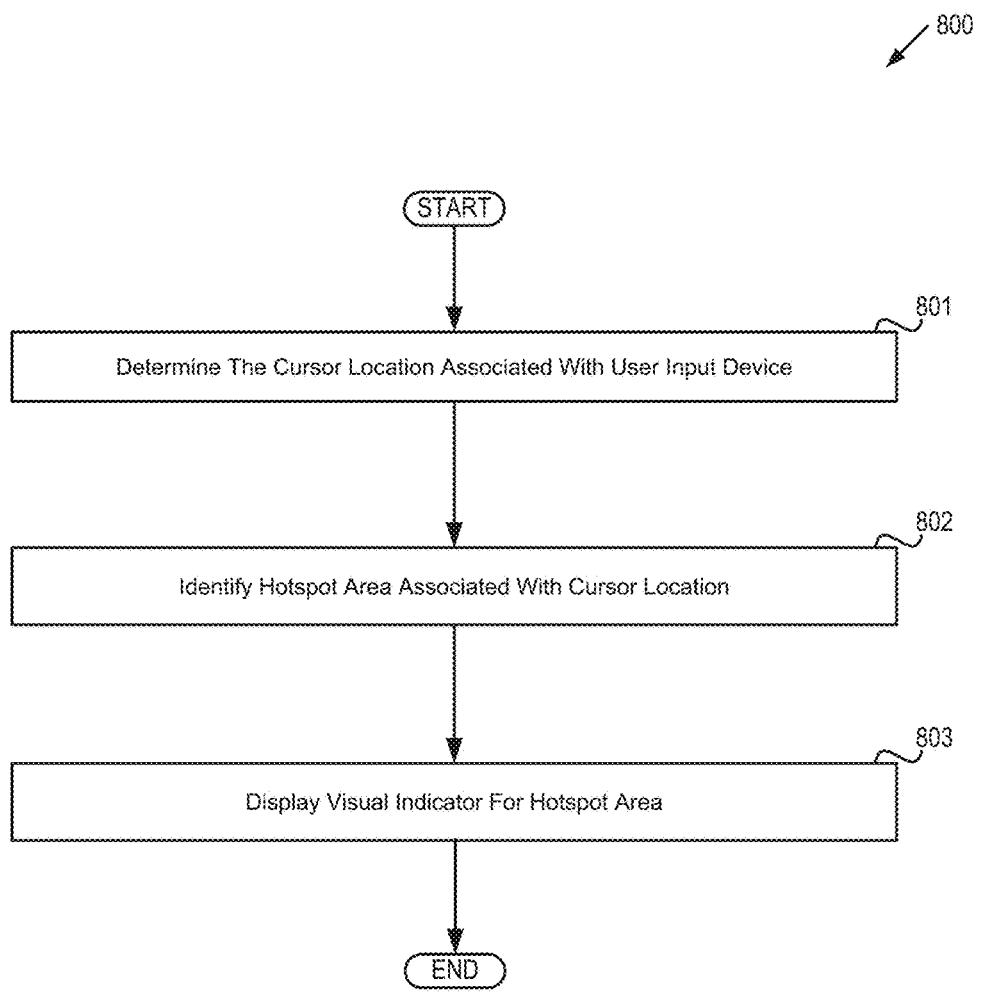
FIG. 8 depicts a flow diagram of a method for identifying a portion of a simulated character available for modification, in accordance with one or more embodiments of the present disclosure.

FIG. 8 depicts a flow diagram of an example method 800 for identifying a portion of a simulated character available for modification. The method may be performed by processing logic that may comprise hardware (circuitry, dedicated logic, etc.), software (such as is run on a general purpose computer system or a dedicated machine), or a combination of both. In one illustrative example, method 800 may be performed by direct manipulation module 620 in FIG. 6. Alternatively, some or all of method 800 might be performed by another module or machine. It should be noted that blocks depicted in FIG. 8 could be performed simultaneously (at least partially overlapping in time) or in a different order than that depicted.

At block 801, processing logic determines a cursor location associated with the user input device. In some implementations, processing logic may use mouse picking (e.g., render-based mouse picking) to determine the location of the cursor as presented by the user interface.

At block 802, processing logic identifies a hotspot area associated with the cursor location. As the user changes the cursor location (e.g., by using the user input device to move the cursor so that it is displayed over different portions of the simulated character), processing logic can identify predefined areas of the simulated character that can be modified by the user ("hotspots") that are associated with the cursor location (e.g., as the cursor is displayed over the predefined areas on the display of the user interface). In an illustrative example, processing logic may identify the hotspot area as described in further detail below with respect to FIG. 9.

At block 803, processing logic displays a visual indicator for the hotspot area. The visual indicator can provide feedback to the user on what portions of the simulated character can be manipulated and what type of operations can be performed. Processing logic may overlay the highlight texture over the hotspot as the user moves the cursor using the input device. Additionally, processing logic may change the appearance of the cursor to indicate the available actions the user may take to modify the area of the simulated character encompassed by the hotspot. For example, the cursor icon may be modified to indicate that the user may move the identified portion of the simulated character (e.g., by displaying arrow pointing in a particular direction), rotate the identified portion of the simulated character (e.g., by displaying an arrow that forms a circular shape), scale the size of the identified portion of the simulated character (e.g., by presenting a diagonal arrow with small boxes increasing in size), or the like. After block 803, the method of FIG. 8 terminates.

Figure 9:
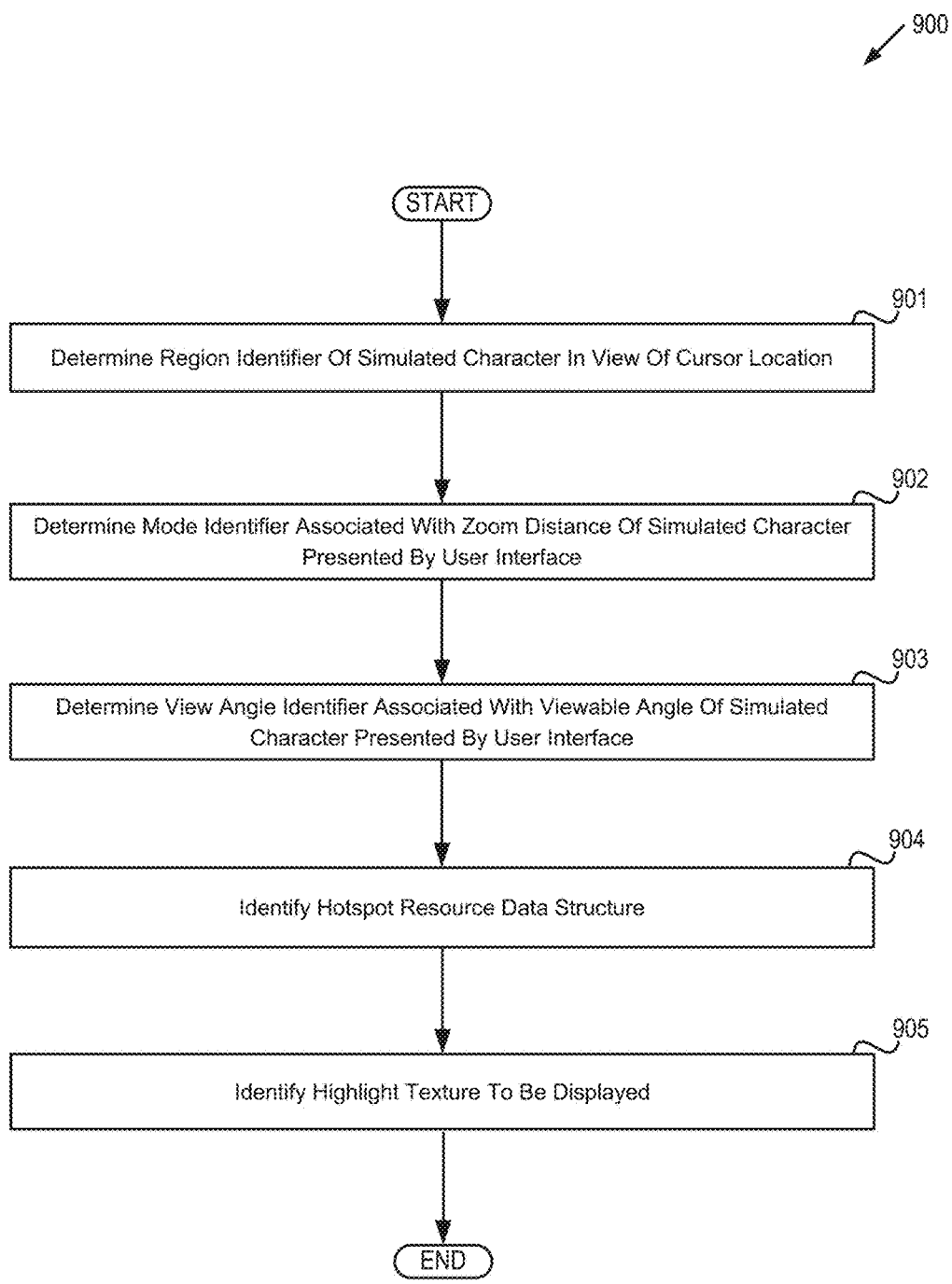
FIG. 9 depicts a flow diagram of a method for identifying a hotspot area of a simulated character that can be modified, in accordance with one or more embodiments of the present disclosure.

FIG. 9 depicts a flow diagram of an example method 900 for identifying a hotspot area of a simulated character that can be modified. The method may be performed by processing logic that may comprise hardware (circuitry, dedicated logic, etc.), software (such as is run on a general purpose computer system or a dedicated machine), or a combination of both. In one illustrative example, method 900 may be performed by direct manipulation module 620 in FIG. 6. Alternatively, some or all of method 900 might be performed by another module or machine. It should be noted that blocks depicted in FIG. 9 could be performed simultaneously (at least partially overlapping in time) or in a different order than that depicted.

At block 901, processing logic determines a region identifier of the simulated character based on the location of the cursor over the display of the simulated character. The region identifier can identify the selectable area of the simulated character. In some implementations, the region identifiers for a simulated character can be predefined and stored as an image file associated with the mesh of the simulated character that contains information describing the selectable areas. Each region that may be selected can be stored in the image file associated with the mesh of the simulated character as a unique color. Thus, the nose area of the character could be represented as a different color from the ear area, and thus have a different region identifier. The region identifiers may be stored separately from the mesh of the simulated character. Alternatively, the color values may be saved as a part of the mesh of the simulated character. In some implementations, the region values may be stored in the image file as RGB color values. When identifying the color value with the cursor position, processing logic may obtain all three RGB values simultaneously, then select one of the three region values according to the mode identifier (in block 902). In an illustrative example, processing logic may determine the region identifier as described in further detail below with respect to FIG. 10.

At block 902, processing logic determines a mode identifier associated with the zoom distance of the simulated character presented by the user interface. Different hotspots may be activated depending on how closely the display of the user interface is zoomed in to view details of the simulated character. In some implementations, the mode identifiers may include a "top-level" mode (e.g., looking at the entire character), "macro-level" (e.g., zoomed in to view the head), or "micro-level" (e.g., further zoomed in to view details of the facial features). In some implementations, processing logic may then use the corresponding RGB channel from the color value identified at block 901 to adjust the region identifier according to the mode identifier.

At block 903, processing logic determines a view angle identifier associated with the viewable angle of the simulated character presented by the user interface. Different hotspots may be activated depending on the view angle of the simulated character presented to the user by the user interface. A simulated character may be displayed to the user in the user interface in one of many different view angles, as if the simulated character were placed on a moving pedestal that could be rotated in predefined increments to show the entire character as the pedestal rotates. The view angles can be configured as uniform portions (or "pie-wedges") of the entire 360 degree circular rotation of the pedestal. For example, the available view angles can include "front-view" (e.g., as if the character were looking straight at the user), "profile" (e.g., displaying the character from the side), "rear-view" (e.g., displaying the character from behind), or any increment in between. Alternatively, the view angles can be configured as portions of a globe in order to provide viewable angles along multiple visual planes (e.g., to provide "top-down" and "bottom-up" views of an object or character.

At block 904, processing logic identifies a hotspot resource data structure using the region identifier from block 901, mode identifier from block 902, and view angle identifier from bock 903. In some implementations, the hotspot resource data structure may be a database accessible to the character manipulation system. Alternatively, the hotspot resource data structure may be stored in a memory space accessible to the character manipulation system. Processing logic may use the combination of identifiers to execute a database lookup for an available hotspot that matches the identifiers. The hotspot resource data structure can store information that can control when a hotspot is available for selection (region/mode/view angle combination), how the hotspot is displayed to the user (e.g., highlight textures that may be applied as a visual indicator to the user of the available hotspot), the type of modification that is available for the user to perform (e.g., widening or narrowing the nose vs. shortening or lengthening the nose), or the like. Processing logic can then use the information in the hotspot resource data structure to display the hotspot to the user and control the modifications that the user may make to the area of the simulated character associated with the hotspot.

At block 905, processing logic identifies a highlight texture to be displayed as a visual indicator for the hotspot area. In some implementations, a highlight texture may be stored as a separate mesh that only includes the area of simulated character associated with the hotspot. Thus, each hotspot can have its own highlight texture. The highlight texture may be displayed over the simulated character to accentuate the hotspot area on the display of the user interface so that the user may easily identify the hotspot. For example, the highlight texture may be a wireframe grid of the hotspot area in a bright color that makes the hotspot area stand out on the display. After block 905, the method of FIG. 9 terminates.

Figure 10:
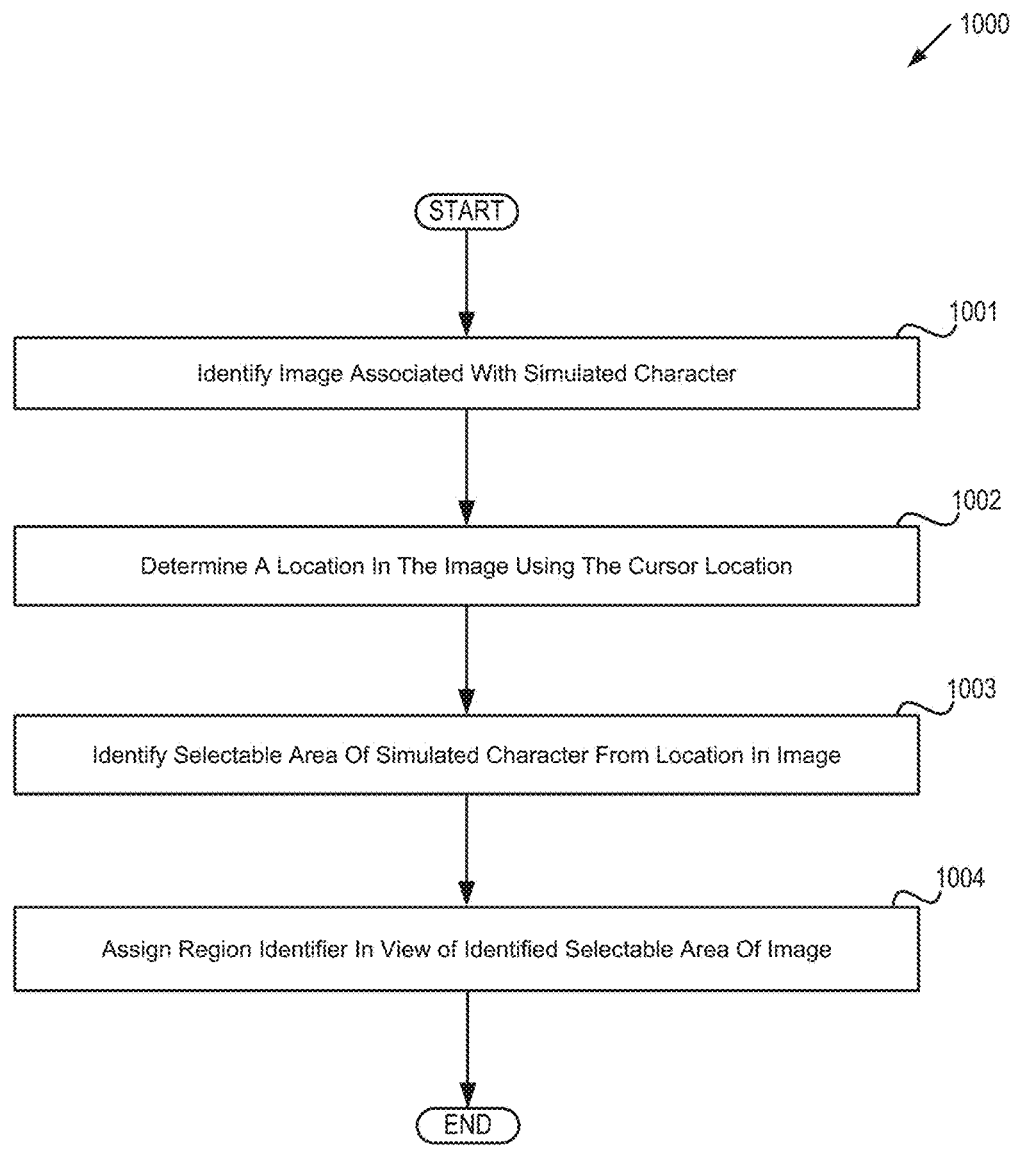
FIG. 10 depicts a flow diagram of a method for determining a region identifier of a simulated character, in accordance with one or more embodiments of the present disclosure.

FIG. 10 depicts a flow diagram of an example method 1000 for determining a region identifier of a simulated character. The method may be performed by processing logic that may comprise hardware (circuitry, dedicated logic, etc.), software (such as is run on a general purpose computer system or a dedicated machine), or a combination of both. In one illustrative example, method 1000 may be performed by direct manipulation module 620 in FIG. 6. Alternatively, some or all of method 1000 might be performed by another module or machine. It should be noted that blocks depicted in FIG. 10 could be performed simultaneously (at least partially overlapping in time) or in a different order than that depicted.

At block 1001, processing logic identifies an image associated with the simulated character. In some implementations, the region identifiers for a simulated character can be predefined and stored as an image file associated with the mesh of the simulated character that contains information describing the selectable areas. Each region that may be selected can be stored in the image file associated with the mesh of the simulated character as a unique color. Thus, the nose area of the character could be represented as a different color from the ear area, and thus have a different region identifier.

At block 1002, processing logic determines a location in the image using the cursor location. Processing logic may use render-based mouse picking (or any similar method of identifying cursor location) to identify the cursor location over the display of the simulated character in the user interface. Processing logic may then use the cursor location over the character to identify the region color value at the corresponding location in the image file.

At block 1003, processing logic identifies a selectable area of the simulated character from the color value stored at the location in the image file. At block 1004, processing logic assigns a region identifier in view of the identified selectable area of the image. After block 1004, the method of FIG. 10 terminates.

Figure 11:
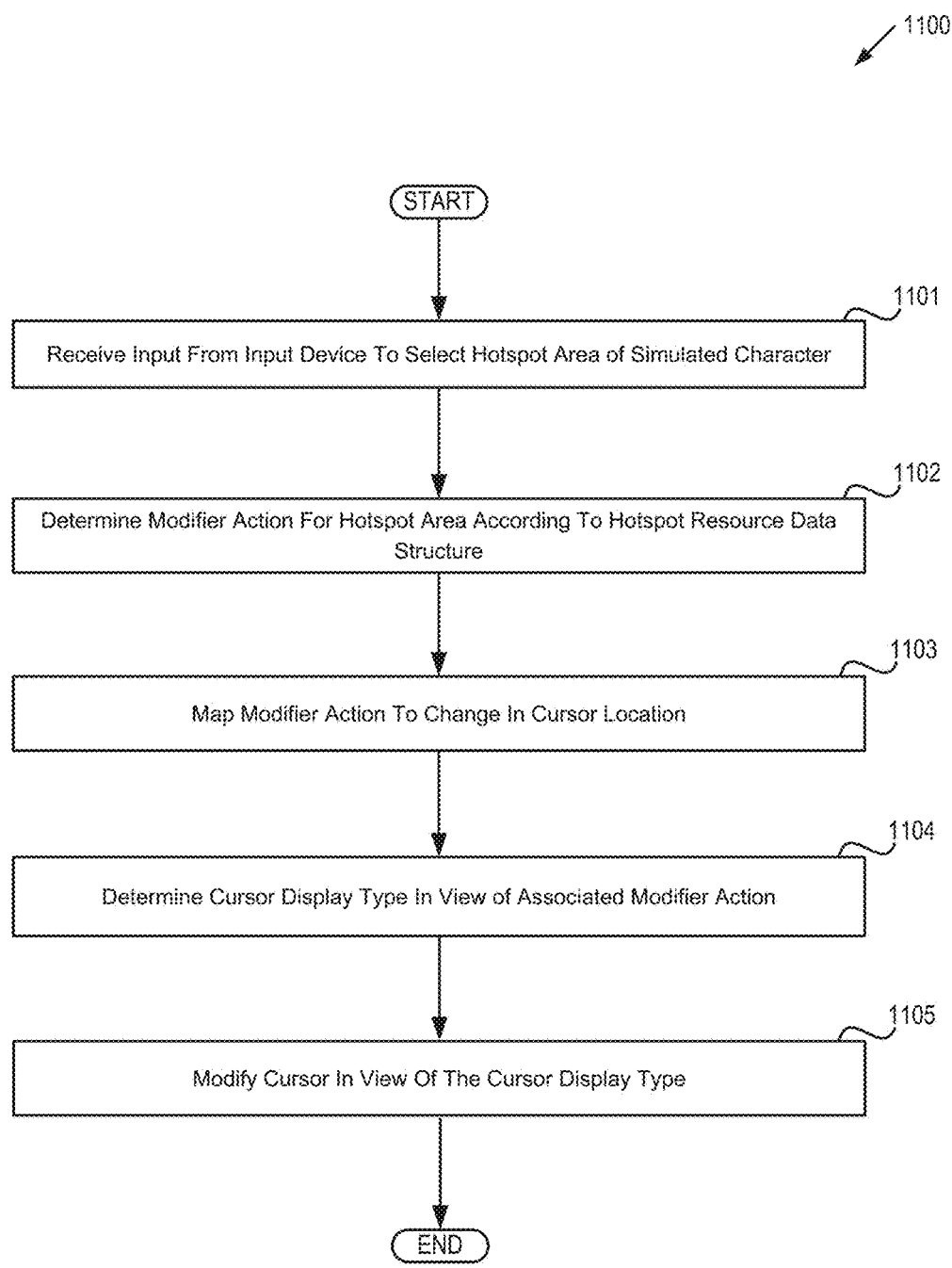
FIG. 11 depicts a flow diagram of a method for selecting an identified portion of a simulated character for modification, in accordance with one or more embodiments of the present disclosure.

FIG. 11 depicts a flow diagram of an example method 1100 for selecting an identified portion of a simulated character for modification. The method may be performed by processing logic that may comprise hardware (circuitry, dedicated logic, etc.), software (such as is run on a general purpose computer system or a dedicated machine), or a combination of both. In one illustrative example, method 1100 may be performed by direct manipulation module 620 in FIG. 6. Alternatively, some or all of method 1100 might be performed by another module or machine. It should be noted that blocks depicted in FIG. 11 could be performed simultaneously (at least partially overlapping in time) or in a different order than that depicted.

At block 1101, processing logic receives input from an input device to select a hotspot area of a simulated character. For example, as the user passes the cursor over the displayed simulated character using a mouse, processing logic can display the highlight textures over each identified hotspot associated with the cursor location as it moves across the display. If the user decides to select one of the identified hotspots to modify the character, the user may use the mouse to invoke the selection (e.g., by clicking one of the mouse buttons).

At block 1102, processing logic determines a modifier action for the hotspot area according to a hotspot resource data structure. The modifier action can include the changes that may be made to the geometry of the hotspot area. Since the modifier action is tied to the hotspot (via the hotspot resource data structure) a particular cursor movement may invoke one type of change for one hotspot, but an entirely different change in another. For example, when viewing the character's nose from "front-view" a side-to-side movement of the cursor (e.g., by moving a mouse) can widen or narrow the nose. In profile view, the different view angle results in the selection of an entirely different hotspot, and thus the same side-to-side cursor movement may invoke an entirely different modifier (e.g., to shorten or elongate the nose). Processing logic may determine the modifier action for the selected hotspot area according to the information stored in the hotspot resource data structure. The modifier action can be associated with an underlying deformation data structure (stored separately from the hotspot resource data structure) that can control the available deformations that can be made to the geometry of the simulated character. For example, the modifier action may be associated with a deformation map, blend shape/morph target, bone delta structure, or any similar data structure that can maintain the deformations that can be applied to the simulated character.

At block 1103, processing logic maps the modifier action to a change in cursor location (e.g., a particular cursor movement received from an input device) that can invoke the modifier action.

At block 1104, processing logic determines a cursor display type in view of the associated modifier action. At block 1105, processing logic modifies the cursor in view of the cursor display type. For example, if the user has selected the hotspot to modify the nose in "front-view" the modifier action to narrow or widen the nose may be mapped to a side-to-side movement of the cursor, and the cursor display may be modified to show a side-to-side arrow with the cursor icon. After block 1105, the method of FIG. 11 terminates.

Figure 12:
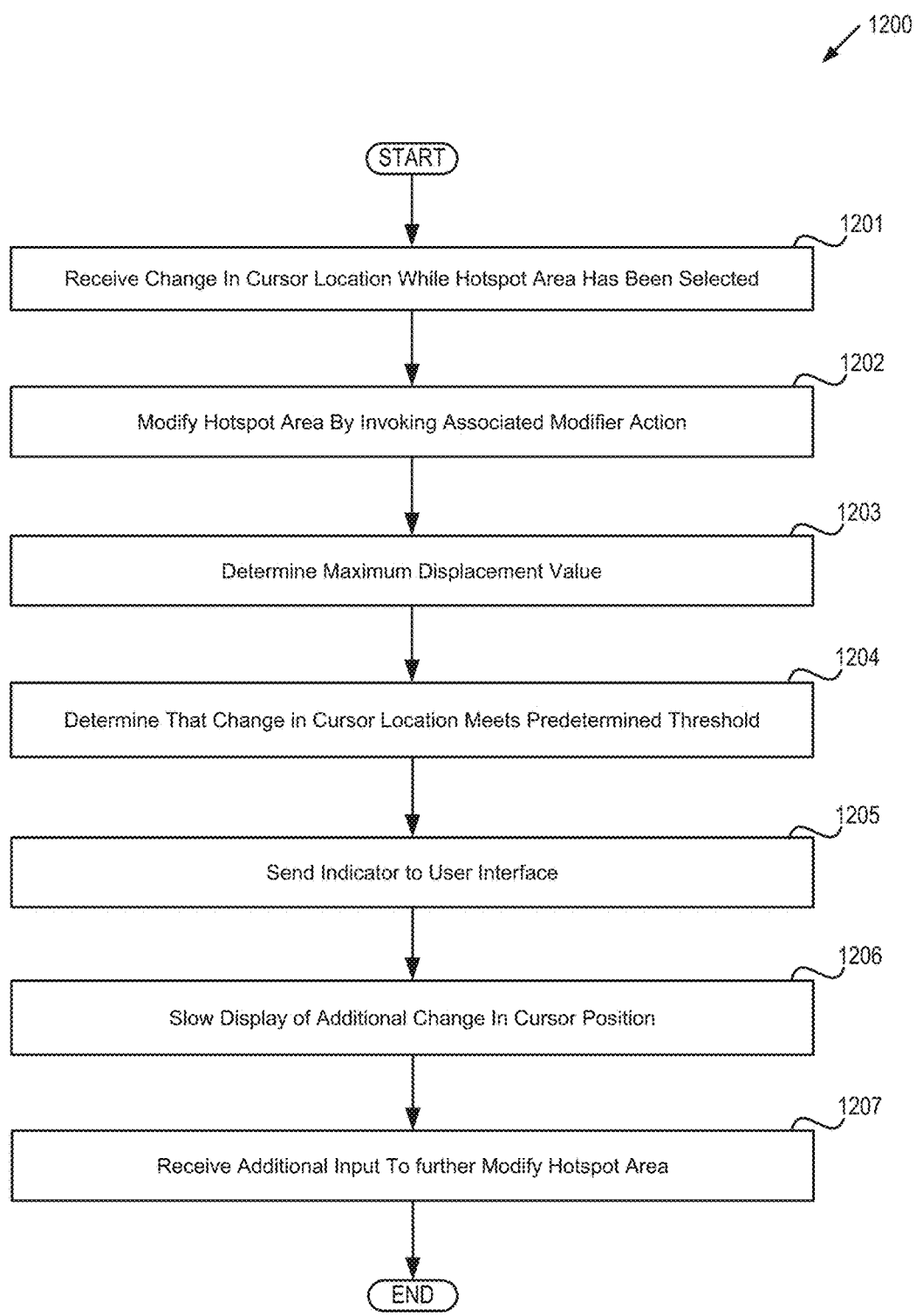
FIG. 12 depicts a flow diagram of a method for modifying a selected portion of a simulated character, in accordance with one or more embodiments of the present disclosure.

FIG. 12 depicts a flow diagram of an example method 1200 for modifying a selected portion of a simulated character. The method may be performed by processing logic that may comprise hardware (circuitry, dedicated logic, etc.), software (such as is run on a general purpose computer system or a dedicated machine), or a combination of both. In one illustrative example, method 1200 may be performed by direct manipulation module 620 in FIG. 6. Alternatively, some or all of method 1200 might be performed by another module or machine. It should be noted that blocks depicted in FIG. 12 could be performed simultaneously (at least partially overlapping in time) or in a different order than that depicted.

At block 1201, processing logic receives a change in cursor location while a hotspot area has been selected. For example, the user may use the input device to select the hotspot (e.g., by clicking and holding a mouse button) and move the cursor location by dragging the cursor to directly manipulate the selected hotspot (e.g., by dragging the mouse while holding the mouse button). At block 1202, processing logic modifies the hotspot area by invoking the associated modifier action. For example, as the user drags the cursor, the character manipulation system can deform the area of the hotspot selected by the user as if the user were pulling the hotspot itself.

At block 1203, processing logic determines a maximum displacement value for the hotspot area. In some implementations, the maximum displacement can be stored in a deformation data structure associated with the hotspot modifier action. At block 1204, processing logic determines that the change in cursor location meets a predetermined threshold. At block 1205, processing logic sends an indicator to the user interface. The indicator can include a different color highlight of the hotspot, an audible alert, a message displayed on the screen, a force-feedback signal to the user input device, or the like. At block 1206, processing logic slows the display of additional change in cursor position.

At block 1207, processing logic receives additional input to further modify the hotspot area. Additional input can be the pressing or holding keys on a keyboard, invoking the scroll wheel of a mouse, a voice command, pressing a game controller button, or the like. The additional input can be received such that it does not change the cursor location (e.g., pressing a key on the keyboard while using the mouse to change the cursor location. The additional input may cause processing logic to implement a modification of a hotspot that is not available in the present view of the hotspot. The main modifier action can be mapped to the cursor movement, and a supplemental modifier action can be assigned to the additional input. For example, if the current view of the character is the "front-view" and the user is widening the nose using a side-to-side mouse drag, the user may use the scroll wheel to elongate the nose at the same time (which would otherwise only be available in "profile view"). After block 1207, the method of FIG. 12 terminates.

Figure 13:
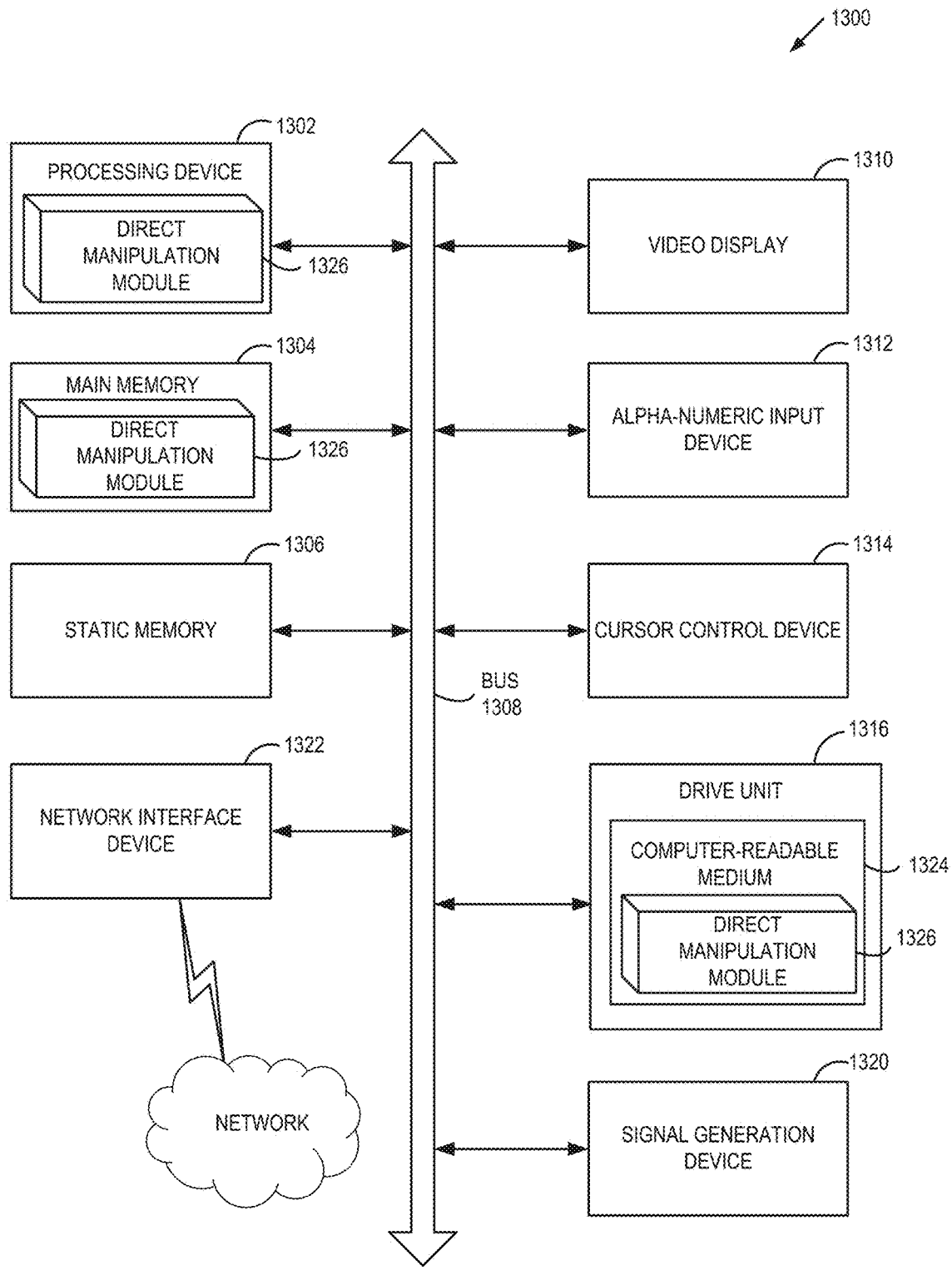
FIG. 13 depicts a block diagram of an illustrative computer system operating in accordance with examples of the invention.

FIG. 13 depicts an example computer system 1300 which can perform any one or more of the methods described herein. In one example, computer system 1300 may correspond to graphical simulation system 600 of FIG. 6. The computer system may be connected (e.g., networked) to other computer systems in a LAN, an intranet, an extranet, or the Internet. The computer system may operate in the capacity of a server in a client-server network environment. The computer system may be a personal computer (PC), a set-top box (STB), a server, a network router, switch or bridge, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The exemplary computer system 1300 includes a processing device 1302, a main memory 1304 (e.g., read-only memory (ROM), flash memory, dynamic random access memory (DRAM) such as synchronous DRAM (SDRAM)), a static memory 1306 (e.g., flash memory, static random access memory (SRAM)), and a data storage device 1316, which communicate with each other via a bus 1308.

Processing device 1302 represents one or more general-purpose processing devices such as a microprocessor, central processing unit (CPU), graphical processing unit (GPU), or the like. More particularly, the processing device 1302 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1302 may also be one or more special-purpose processing devices such as an application specific integrated circuit (ASIC), a field programmable gate array (FPGA), a digital signal processor (DSP), network processor, or the like. The processing device 1302 is configured to execute direct manipulation module 1326 for performing the operations and steps discussed herein (e.g., corresponding to the methods of FIGS. 7-12, etc.).

The computer system 1300 may further include a network interface device 1322. The computer system 1300 also may include a video display unit 1310 (e.g., a liquid crystal display (LCD) or a cathode ray tube (CRT)), an alphanumeric input device 1312 (e.g., a keyboard), a cursor control device 1314 (e.g., a mouse), and a signal generation device 1320 (e.g., a speaker). In one illustrative example, the video display unit 1310, the alphanumeric input device 1312, and the cursor control device 1314 may be combined into a single component or device (e.g., an LCD touch screen).

The data storage device 1316 may include a computer-readable medium 1324 on which is stored direct manipulation module 1326 (e.g., corresponding to the methods of FIGS. 7-12, etc.) embodying any one or more of the methodologies or functions described herein. Direct manipulation module 1326 may also reside, completely or at least partially, within the main memory 1304 and/or within the processing device 1302 during execution thereof by the computer system 1300, the main memory 1304 and the processing device 1302 also constituting computer-readable media. Direct manipulation module 1326 may further be transmitted or received over a network via the network interface device 1322.

While the computer-readable storage medium 1324 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the invention should, therefore, be determined with reference to the appended claims, along with the full scope of equivalents to which such claims are entitled. Particularly, while embodiments of the present disclosure have been described above as applying to polygonal models, these embodiments can also be applied in a similar manner to other three dimensional surface representation structures such as nurbs, splines, subdivision surfaces, etc.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "selecting," "modifying," "determining," "displaying," "assigning," "receiving," "mapping," "sending," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:
1. A method comprising:
identifying, by a processing device, a zoom level associated with an image of a simulated video game character;
identifying a color channel corresponding to the identified zoom level;

identifying, based on a location of a cursor associated with an input device, a region identifier stored in the identified color channel of the image;

identifying, based on the region identifier, a portion of the simulated video game character; and modifying, by the processing device, the portion of the simulated video game character according to an input received from the input device.

2. The method of claim 1, wherein identifying the portion of the simulated video game character comprises:

displaying a visual indicator for portion of the simulated video game character.

3. The method of claim 1, wherein identifying the portion of the simulated video game character comprises:

determining a view angle identifier associated with a viewable angle of the simulated video game character.

4. The method of claim 1, wherein modifying the portion of the simulated video game character comprises:

determining a modifier action based on a change of the location of the cursor;

determining a cursor display type according to the modifier action; and modifying the cursor in view of the cursor display type.

5. The method of claim 1, wherein modifying the portion of the simulated video game character comprises:

receiving a change in the location of the cursor; and modifying the portion of the simulated character in view of the change in the location of the cursor.

6. The method of claim 5, further comprising:

determining that the change in the location of the cursor meets a predetermined threshold;

sending an indicator to a user interface that the predetermined threshold has been met.

7. The method of claim 5, further comprising:

receiving additional input from the input device to further modify the portion of the simulated video game character, wherein the additional input does not change the location of the cursor.

8. The method of claim 1, wherein the first color channel corresponds to a top-level zoom, a second color channel corresponds to a macro-level zoom, and a third color channel corresponds to a micro-level zoom.

9. The method of claim 1, wherein the modifier action comprises at least one of: moving the portion of the simulated video game character, rotating the portion of the simulated video game character, or re-sizing the portion of the simulated video game character.

10. The method of claim 1, wherein identifying the portion of the simulated video game character further comprises:

identifying a highlight texture;

displaying, using the highlight texture, the portion of the simulated video game character.

11. An apparatus, comprising:

a memory to store instructions; and a processing device, operatively coupled to the memory, to execute the instructions, wherein the processing device is to:

identify a zoom level associated with an image of a simulated video game character;

identify a color channel corresponding to the identified zoom level;

identify, based on a location of a cursor associated with an input device, a region identifier stored in the identified color channel of the image;

identify, based on the region identifier, a portion of the simulated video game character;

modify the selected portion of the simulated video game character according to an input received from the input device.

12. The apparatus of claim 11, wherein the processing device is further to:

display a visual indicator for the portion of the simulated video game character.

13. The apparatus of claim 11, wherein to identify the portion of the simulated video game character, the processing device is to:

determine a view angle identifier associated with a viewable angle of the simulated video game character.

14. The apparatus of claim 11, wherein to modify the portion of the simulated video game character, the processing device is to:

determine a modifier action based on a change of the location of the cursor;

determine a cursor display type according to the modifier action; and modify the cursor in view of the cursor display type.

15. The apparatus of claim 11, wherein to modify the portion of the simulated video game character, the processing device is to:

receive a change in the location of the cursor;

modify the portion of the simulated element in view of the change in the location of the cursor;

determine that the change in the location of the cursor meets a predetermined threshold;

send an indicator to a user interface that the predetermined threshold has been met.

16. A non-transitory computer readable storage medium, having instructions stored therein, which when executed by a processing device, cause the processing device to:

identify a zoom level associated with an image of a simulated video game character;

identify a color channel corresponding to the identified zoom level;

identify, based on a location of a cursor associated with an input device, a region identifier stored in the identified color channel of the image;

identify, based on the region identifier, a portion of the simulated video game character; and modify the selected portion of the simulated video game character according to an input received from the input device.

17. The non-transitory computer readable storage medium of claim 16, wherein the processing device is further to:

display a visual indicator for the portion of the simulated video game character.

18. The non-transitory computer readable storage medium of claim 16, wherein to identify the portion of the simulated video game character, the processing device is to:

determine a view angle identifier associated with a viewable angle of the simulated video game character.

19. The non-transitory computer readable storage medium of claim 16, wherein to modify the portion of the simulated video game character, the processing device is to:

determine a modifier action based on a change of the location of the cursor;

determine a cursor display type according to the modifier action; and modify the cursor in view of the cursor display type.

20. The non-transitory computer readable storage medium of claim 16, wherein to modify the portion of the simulated video game character, the processing device is to:

receive a change in the location of the cursor;

modify the portion of the simulated video game character in view of the change in the location of the cursor;
determine that the change in the location of the cursor meets a predetermined threshold;
send an indicator to a user interface that the predetermined threshold has been met.

\* \* \* \* \*